US012561033B2

(12) United States Patent
Huang et al.

(10) Patent No.: US 12,561,033 B2
(45) Date of Patent: Feb. 24, 2026

(54) CAPACITIVE TOUCH SENSING WITH REDUCED AMBIENT LIGHT INTERFERENCE

(71) Applicant: Apple Inc., Cupertino, CA (US)

(72) Inventors: Bin Huang, Sunnyvale, CA (US); William Paul, San Francisco, CA (US); Luya Zhang, Sunnyvale, CA (US); Christoph H. Krah, Cupertino, CA (US); Stanley B. Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/035,673

(22) Filed: Jan. 23, 2025

(65) Prior Publication Data

US 2026/0010263 A1     Jan. 8, 2026

Related U.S. Application Data

(60) Provisional application No. 63/668,617, filed on Jul. 8, 2024.

(51) Int. Cl.
*G06F 3/041*          (2006.01)
*G06F 3/044*          (2006.01)

(52) U.S. Cl.
CPC ........ *G06F 3/04186* (2019.05); *G06F 3/0443* (2019.05); *G06F 2203/04107* (2013.01)

(58) Field of Classification Search
CPC ................................................. G06F 3/04186
See application file for complete search history.

(56) References Cited

U.S. PATENT DOCUMENTS

| | | | |
|---|---|---|---|
| 7,002,555 B1 | 2/2006 | Jacobsen et al. | |
| 7,166,966 B2 | 1/2007 | Naugler, Jr. et al. | |
| 8,154,532 B2 | 4/2012 | Chou et al. | |
| 8,368,663 B2 | 2/2013 | Izadi et al. | |
| 9,347,833 B2 | 5/2016 | Wyrwas et al. | |
| 10,319,744 B2 | 6/2019 | Yamazaki et al. | |
| 11,249,598 B2 | 2/2022 | Wang et al. | |
| 11,741,209 B2 | 8/2023 | Yoshimoto et al. | |
| 11,899,867 B2 * | 2/2024 | Gray ................... | G06F 3/04842 |
| 11,921,952 B1 * | 3/2024 | Chang .................. | G06F 3/0446 |
| 12,100,240 B1 * | 9/2024 | Chang ................ | G06V 40/1318 |
| 2009/0066669 A1 * | 3/2009 | Olson ................... | G06F 3/0446 |
| | | | 345/174 |
| 2021/0311585 A1 | 10/2021 | Duxbury et al. | |

(Continued)

*Primary Examiner* — Chun-Nan Lin
(74) *Attorney, Agent, or Firm* — Kubota & Basol LLP

(57)                ABSTRACT

A touch sensor panel can include a plurality of touch electrodes, one or more light detectors, a plurality of chiplets configurable for light sensing operation using the one or more light detectors or touch sensing operation using the plurality of touch electrodes, and processing circuitry coupled to the plurality of chiplets. The processing circuitry can be programmed to, in a first mode of touch sensing operation, in accordance with a determination that light detected by the one or more light detectors coupled to one or more first chiplets of the plurality of chiplets configured for the light sensing operation meets one or more first criteria, discard (or compensate) touch sensing results detected at the plurality of touch electrodes coupled to one or more second chiplets of the plurality of chiplets configured for the touch sensing operation.

20 Claims, 9 Drawing Sheets

MOBILE TELEPHONE 136

TOUCH SCREEN 124

TOUCH SCREEN 126

MEDIA PLAYER 140

(56) References Cited

U.S. PATENT DOCUMENTS

| | | | | |
|---|---|---|---|---|
| 2021/0333926 | A1* | 10/2021 | Wang | G06V 40/1318 |
| 2022/0327187 | A1* | 10/2022 | Yoshimoto | H01L 25/167 |
| 2023/0094533 | A1* | 3/2023 | Krah | H10H 29/142 |
| | | | | 345/174 |
| 2023/0341975 | A1 | 10/2023 | Yeke Yazdandoost et al. | |
| 2024/0103669 | A1* | 3/2024 | Paul | G06F 3/044 |

* cited by examiner

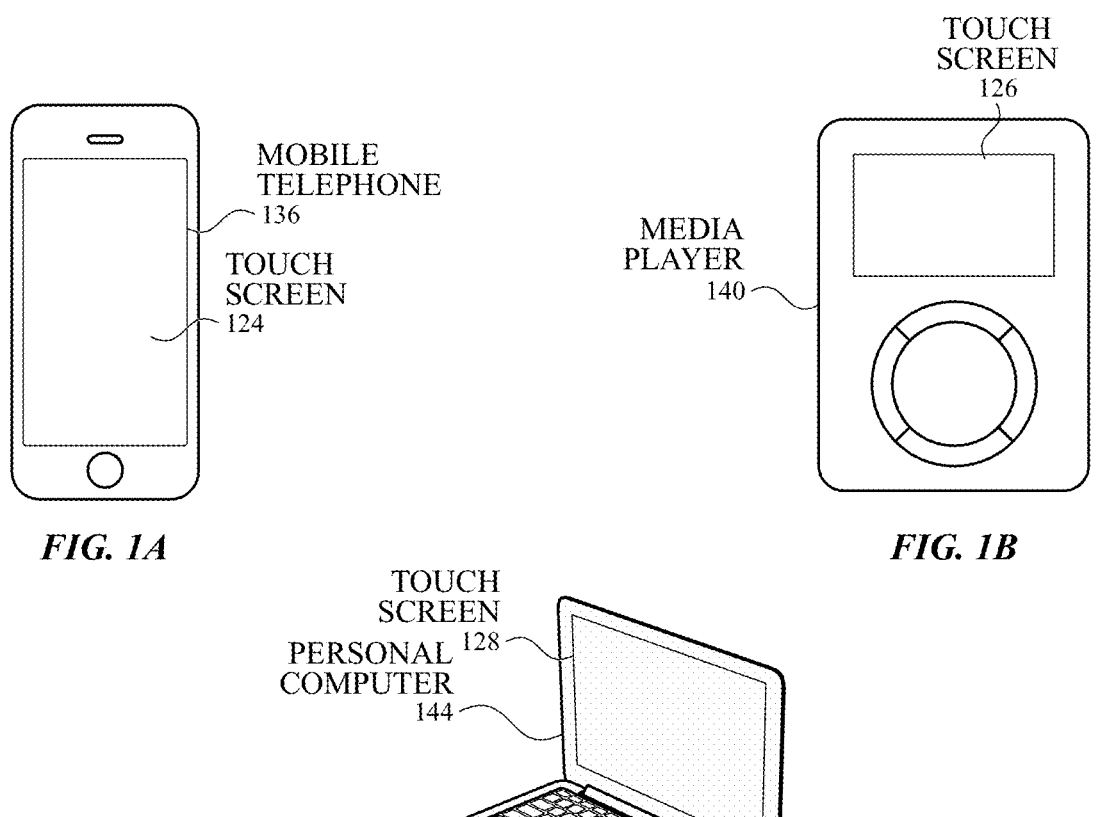
MOBILE
TELEPHONE
136
TOUCH
SCREEN
124
*FIG. 1A*
TOUCH
SCREEN
126
MEDIA
PLAYER
140
*FIG. 1B*
TOUCH
SCREEN
PERSONAL 128
COMPUTER
144
TRACK PAD
146
*FIG. 1C*
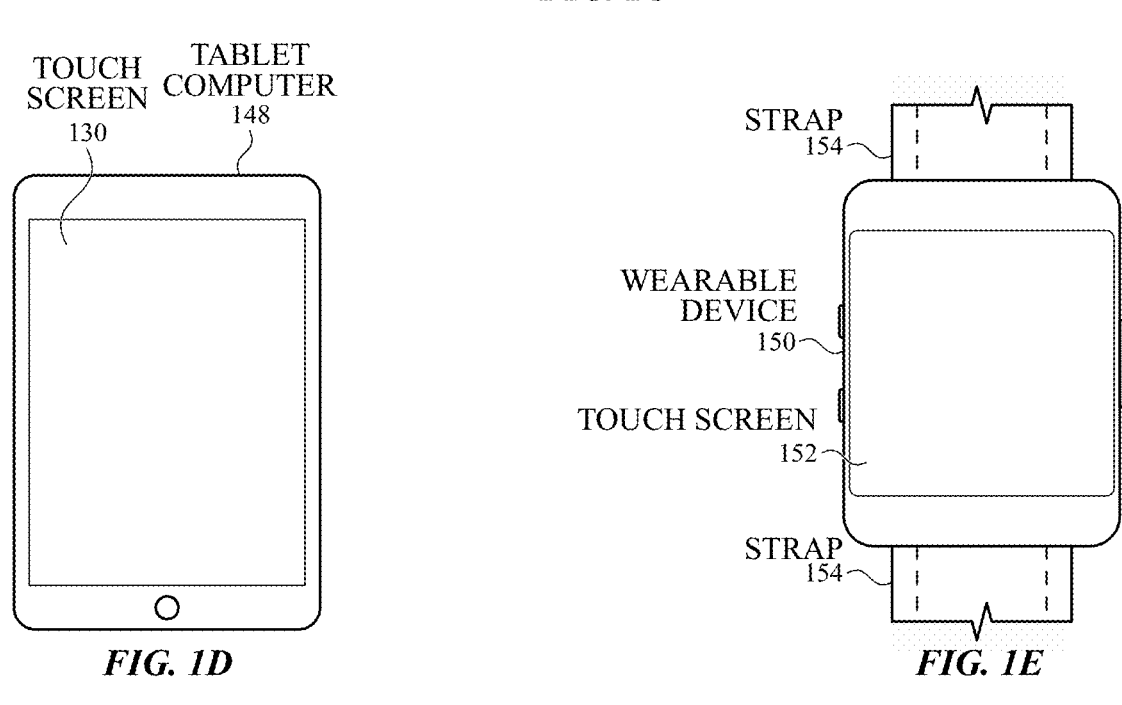
TOUCH   TABLET
SCREEN  COMPUTER
130     148
*FIG. 1D*
STRAP
154
WEARABLE
DEVICE
150
TOUCH SCREEN
152
STRAP
154
*FIG. 1E*

OBJECT
238

230

240
$C_{BODY}$

242
$C_{TOUCH}$

252

236

244
$C_P$

258

246
$C_S$

CHIPLET                    207

250

248

GUARD GROUND PLANE

254          GUARD SOURCE

232

EARTH/CHASSIS GROUND
234

256

254

$C_{TOUCH}$

242

$V_{REF}$

250

| | TOUCH MODE | | | |
|---|---|---|---|---|
| | S1 | M1 | M2 | M3 |
| OPERATING FREQUENCY | LOW | LOW | MID | HIGH |
| POWER | LOW | LOW | MID | HIGH |
| LIGHT SENSITIVITY | LOW | HIGH | MID | LOW |

CAPACITIVE TOUCH SENSING WITH REDUCED AMBIENT LIGHT INTERFERENCE

CROSS REFERENCE TO RELATED APPLICATIONS

This application claims the benefit of U.S. Provisional Application No. 63/668,617, filed Jul. 8, 2024, the entire disclosure of which is herein incorporated by reference for all purposes.

FIELD OF THE DISCLOSURE

This relates generally to an electronic device including touch and/or proximity sensing and including optical sensing, and more particularly to an electronic device including integrated micro circuitry configurable for optical sensing and touch and/or proximity sensing.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electric fields used to detect touch can extend beyond the surface of the display, and objects approaching near the surface may be detected near the surface without actually touching the surface.

SUMMARY OF THE DISCLOSURE

This relates generally to an electronic device including touch and/or proximity sensing and including optical sensing, and more particularly to an electronic device including integrated micro circuitry configurable for optical sensing and touch and/or proximity sensing. Some examples of the disclosure are directed to a touch sensor panel that can adjust touch sensing operations based on detected lighting conditions (e.g., ambient light or from other light sources). In particular, the touch sensor panel can detect light incident on the touch sensor panel during touch sensing, and based at least on the detected light intensity level and the light sensitivity of the current touch operation mode, transmit the touch results to the touch processor, compensate for light-induced touch errors in the touch results before or after transmission, and/or discard the touch results for an excessive level of light-induced touch error. In some examples, the touch sensor panel can further transition to a less light sensitive touch operation mode in response to the detected light intensity. Adjusting touch sensing operations based on detected light allows the touch sensing panel to reduce or minimize light induced touch errors.

BRIEF DESCRIPTION OF THE DRAWINGS

FIGS. 1A-1E illustrate example systems in which an integrated touch screen according to examples of the disclosure may be implemented.

DETAILED DESCRIPTION

Figure 2A:
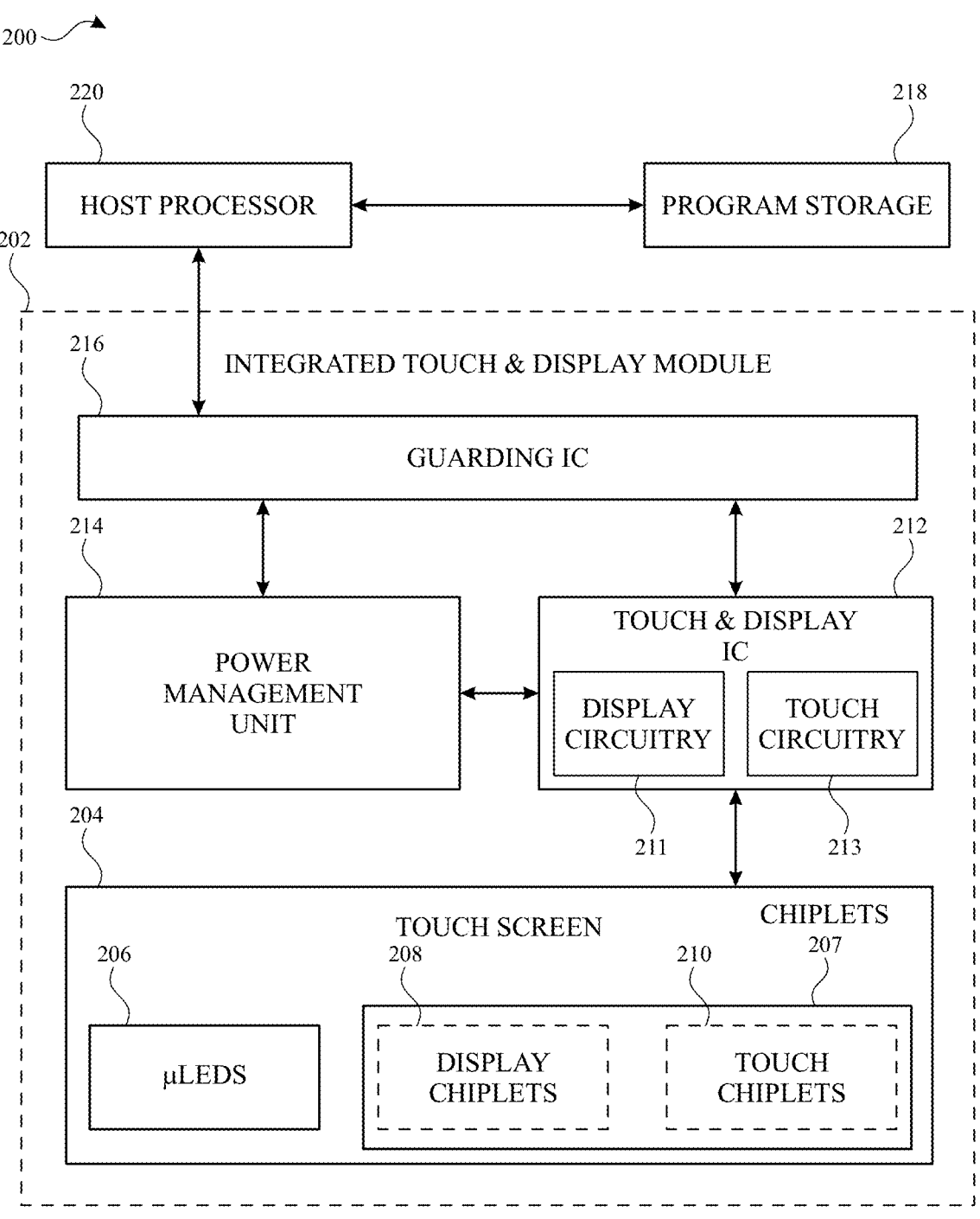
FIG. 2A is a block diagram of an example computing system that illustrates one implementation of an example integrated touch screen according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to an electronic device including touch and/or proximity sensing and including optical sensing, and more particularly to an electronic device including integrated micro circuitry configurable for optical sensing and touch and/or proximity sensing. As described herein, touch and/or proximity sensing primarily refers to capacitive touch and/or proximity sensing, and optical sensing refers to light sensing operations including ambient light sensing and optical touch and/or proximity detection. Some examples of the disclosure are directed to a touch sensor panel that can adjust touch sensing operations based on detected lighting conditions (e.g., ambient light or from other light sources). In particular, the touch sensor panel can detect light incident on the touch sensor panel during touch sensing, and based at least on the detected light intensity level and the light sensitivity of the current touch operation mode, transmit the touch results to the touch processor, compensate for light-induced touch errors in the touch results before or after transmission, and/or discard the touch results for an excessive level of light-induced touch error. In some examples, the touch sensor panel can further transition to a less light sensitive touch operation mode in response to the detected light intensity. Adjusting touch sensing operations based on detected light allows the touch sensing panel to reduce or minimize light induced touch errors.

In some examples, a touch sensor panel (and/or a touch screen including the touch sensor panel) can include a plurality of touch electrodes, one or more light detectors, a plurality of chiplets configurable for light sensing operation using the one or more light detectors or touch sensing operation using the plurality of touch electrodes, and processing circuitry coupled to the plurality of chiplets. The processing circuitry can be programmed to, in a first mode of touch sensing operation, in accordance with a determination that light detected by the one or more light detectors coupled to one or more first chiplets of the plurality of chiplets configured for the light sensing operation meets one or more first criteria, discard (or compensate) touch sensing results detected at the plurality of touch electrodes coupled to one or more second chiplets of the plurality of chiplets configured for the touch sensing operation. In some examples, the processing circuitry can be further programmed to, in the first mode of touch sensing operation, in accordance with the determination that the light detected by the one or more light detectors meets one or more first criteria, transition from the first mode of touch sensing operation to a second (less light-sensitive) mode of touch sensing operation, different than the first mode of touch sensing operation.

FIGS. 1A-1E illustrate example systems in which an integrated touch screen according to examples of the disclosure may be implemented. FIG. 1A illustrates an example mobile telephone 136 that includes an integrated touch screen 124. FIG. 1B illustrates an example digital media player 140 that includes an integrated touch screen 126. FIG. 1C illustrates an example personal computer 144 that includes a trackpad 146 and an integrated touch screen 128. FIG. 1D illustrates an example tablet computer 148 that includes an integrated touch screen 130. FIG. 1E illustrates an example wearable device 150 (e.g., a watch) secured to the user by strap(s) 154 that includes an integrated touch screen 152. It is understood that the above integrated touch screens can be implemented in other devices as well. Additionally, it should be understood that although the disclosure herein primarily focuses on integrated touch screens, some of the disclosure is also applicable to touch sensor panels without a corresponding display.

In some examples, touch screens 124, 126, 128, 130 and 152 can be based on self-capacitance. A self-capacitance based touch system can include a matrix of small, individual plates of conductive material or groups of individual plates of conductive material forming larger conductive regions that can be referred to as touch node electrodes. For example, a touch screen can include a plurality of individual touch node electrodes, each touch node electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 152 can be based on mutual capacitance. A mutual capacitance based touch system can include electrodes arranged as drive and sense lines that may cross over each other on different layers, or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128 and 130 can be based on mutual capacitance and/or self-capacitance. The electrodes can be arranged as a matrix of small, individual plates of conductive material or as drive lines and sense lines, or in another pattern. The electrodes can be configurable for mutual capacitance or self-capacitance sensing or a combination of mutual and self-capacitance sensing. For example, in one mode of operation, electrodes can be configured to sense mutual capacitance between electrodes, and in a different mode of operation, electrodes can be configured to sense self-capacitance of electrodes. In some examples, some of the electrodes can be configured to sense mutual capacitance therebetween and some of the electrodes can be configured to sense self-capacitance thereof.

FIG. 2A is a block diagram of an example computing system 200 that illustrates one implementation of an example integrated touch screen 204 according to examples of the disclosure. As described in more detail herein, the integrated touch screen 204 can include light emitting diodes (LEDs) or organic light emitting diodes (OLEDs) represented by micro-LEDs 206 and chiplets 207 (e.g., integrated chiplets including LED/OLED drivers, touch sensing circuitry and/or optical sensing circuitry). In some examples, the functionality of chiplets can be divided into separate display chiplets 208 (e.g., including LED/OLED drivers) and touch chiplets 210 (e.g., including touch sensing circuitry and/or optical sensing circuitry). Computing system 200 can be included in, for example, mobile telephone 136, digital media player 140, personal computer 144, tablet computer 148, wearable device 150 or any mobile or non-mobile computing device that includes a touch screen. Computing system 200 can include integrated touch and display module 202, host processor 220 and program storage 218. Integrated touch and display module 202 can include integrated touch screen 204 and integrated circuits for operation of integrated touch screen 204. In some examples, integrated touch and display module 202 can be formed on a single substrate with micro-LEDs 206 and chiplets 207 (or display chiplets 208 and/or touch chiplets 210) of integrated touch screen 204 on one side of the touch screen and integrated circuits controlling operation of micro-LEDs 206 and chiplets 207 mounted on an opposite side of the single substrate. Forming integrated touch and display module 202 in this way can provide for simplified manufacturing and assembly of devices with a touch screen. In some examples, the integrated touch and display module 202 can be formed on a single substrate with micro-LEDs 206 on one side of the substrate and chiplets 207 (or display chiplets 208 and/or touch chiplets 210) of integrated touch screen 204 and integrated circuits controlling operation of micro-LEDs 206 and chiplets 207 mounted on an opposite side of the single substrate.

Integrated circuits for operation of integrated touch screen 204 can include an integrated touch and display integrated circuit (touch and display controller) 212, a power management unit (PMU) 214, and optionally a guard integrated circuit (guard IC) 216. As described in more detail herein, self-capacitance touch sensing performance can be improved (and parasitic capacitance effects reduced) by performing touch sensing operations in a different power domain than in the chassis power domain. In some examples, guard IC 216 can be used to operate integrated touch and display module 202 in a guard power domain during guarded touch operation and operate touch and display module 202 in the chassis power domain otherwise (e.g., during non-guarded touch operations or during display operations). Power management unit 214 can be an integrated circuit configured to provide the voltages necessary for the touch and display controller 212, including guard-referenced power supplies when operating in a guarded power domain. The touch and display controller 212 can include circuitry to perform touch sensing, optical sensing and display operations. Although illustrated in FIG. 2A as a single integrated circuit, the various components and/or functionality of the touch and display controller 212 can be implemented with multiple circuits, elements, chips, and/or discrete components (e.g., a separate touch integrated circuit and a separate display integrated circuit with an integrated circuit to handle the handoff between the two).

The touch and display controller 212 can include display circuitry 211 to perform display operations. Display circuitry 211 can include hardware to process one or more still images and/or one or more video sequences for display on integrated touch screen 204. The display circuitry 211 can be configured to generate read memory operations to read the data representing the frame/video sequence from a memory (not shown) through a memory controller (not shown), for example, or can receive the data representing the frame/video sequence from host processor 220. The display circuitry 211 can be configured to perform various processing on the image data (e.g., still images, video sequences, etc.).

In some examples, the display circuitry 211 can be configured to scale still images and to dither, scale and/or perform color space conversion on the frames of a video sequence. Display circuitry 211 can be configured to blend the still image frames and the video sequence frames to produce output frames for display. The display circuitry 211 can also be more generally referred to as a display controller, display pipe, display control unit, or display pipeline. The display control unit can be generally any hardware and/or firmware configured to prepare a frame for display from one or more sources (e.g., still images and/or video sequences). More particularly, the display circuitry 211 can be configured to retrieve source frames from one or more source buffers stored in memory, composite frames from the source buffers, and display the resulting frames on integrated touch screen 204. Accordingly, the display circuitry 211 can be configured to read one or more source buffers and composite the image data to generate the output frame. Display circuitry 211 can provide various control and data signals to the display, via chiplets 207 (or via display chiplets 208), including timing signals (e.g., one or more clock signals) and pixel selection signals. The timing signals can include a pixel clock that can indicate transmission of a pixel. The data signals can include color signals (e.g., red, green, blue) for micro-LEDs 206. The display circuitry can control integrated touch screen 204 in real-time, providing the data indicating the pixels to be displayed as the touch screen is displaying the image indicated by the frame. The interface to such an integrated touch screen 204 can be, for example, a video graphics array (VGA) interface, a high definition multimedia interface (HDMI), a mobile industry processor interface (MIPI), a digital video interface (DVI), an LCD/LED/OLED interface, a plasma interface, or any other suitable interface.

The touch and display controller 212 can include touch circuitry 213 to perform touch operations. Touch circuitry 213 can include one or more touch processors, peripherals (e.g., random access memory (RAM) or other types of memory or storage, watchdog timers and the like), and a touch controller. The touch controller can include, but is not limited to, channel scan logic (e.g., implemented in programmable logic circuits or as discrete logic circuits) which can provide configuration and control for touch sensing operations by chiplets 207 (or by touch chiplets 210). For example, touch chiplets 210 can be configured to drive, sense and/or ground touch node electrodes depending on the mode of touch sensing operations. Additionally or alternatively, the chiplets 207 (or touch chiplets 210) can be configured for optical sensing (e.g., using touch circuitry 213 of touch and display controller 212 or using separate circuitry and a separate controller for optical sensing operations). The mode of touch sensing and/or optical sensing operations can, in some examples, be determined by a scan plan stored in memory (e.g., RAM) in touch circuitry 213. The scan plan can provide a sequence of scan events to perform during a frame. The scan plan can also include information necessary for providing control signals to and programming chiplets 207 for the specific scan event to be performed, and for analyzing data from chiplets 207 according to the specific scan event to be performed. The scan events can include, but are not limited to, a mutual capacitance scan, a self-capacitance scan, a stylus scan, touch spectral analysis scan, a stylus spectral analysis scan, and an optical sensing scan. The channel scan logic or other circuitry in touch circuitry 213 can provide the stimulation signals at various frequencies and phases that can be selectively applied to the touch node electrodes of integrated touch screen 204 or used for demodulation, as described in more detail below. The touch circuitry 213 can also receive touch data from the chiplets 207 (or touch chiplets 210), store touch data in memory (e.g., RAM), and/or process touch data (e.g., by one or more touch processors or touch controller) to determine locations of touch and/or clean operating frequencies for touch sensing operations (e.g., spectral analysis). The touch circuitry 213 (or separate optical sensing circuitry) can also receive ambient light data from the chiplets 207 (or touch chiplets 210), store ambient light data in memory (e.g., RAM), and/or process ambient light data (e.g., by one or more touch processors or touch controller or an optical sensing processor/controller) to determine ambient light conditions.

Integrated touch screen 204 can be used to derive touch data at multiple discrete locations of the touch screen, referred to herein as touch nodes. For example, integrated touch screen 204 can include touch sensing circuitry that can include a capacitive sensing medium having a plurality of electrically isolated touch node electrodes. Touch node electrodes can be coupled to chiplets 207 (or touch chiplets 210) for touch sensing by sensing channel circuitry. As used herein, an electrical component "coupled to" or "connected to" another electrical component encompasses a direct or indirect connection providing electrical path for communication or operation between the coupled components. Thus, for example, touch node electrodes of integrated touch screen 204 may be directly connected to chiplets 207 or indirectly connected to chiplets 207 (e.g., connected to touch chiplets 210 via display chiplets 208), but in either case provided an electrical path for driving and/or sensing the touch node electrodes. Labeling the conductive plates (or groups of conductive plates) used to detect touch as touch node electrodes corresponding to touch nodes (discrete locations of the touch screen) can be particularly useful when integrated touch screen 204 is viewed as capturing an "image" of touch (or "touch image"). The touch image can be a two-dimensional representation of values indicating an amount of touch detected at each touch node electrode corresponding to a touch node in integrated touch screen 204. The pattern of touch nodes at which a touch occurred can be thought of as a touch image (e.g., a pattern of fingers touching the touch screen). In such examples, each touch node electrode in a pixelated touch screen can be sensed for the corresponding touch node represented in the touch image.

Host processor 220 can be connected to program storage 218 to execute instructions stored in program storage 218 (e.g., a non-transitory computer-readable storage medium). Host processor 220 can provide, for example, control and data signals so that touch and display controller 212 can generate a display image on integrated touch screen 204, such as a display image of a user interface (UI). Host processor 220 can also receive outputs from touch and display controller 212 (e.g., touch inputs from the one or more touch processors, ambient light information, etc.) and performing actions based on the outputs. The touch input can be used by computer programs stored in program storage 218 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 220 can also perform additional functions that may not be related to touch processing, optical sensing, and display.

Note that one or more of the functions described herein, including the configuration and operation of chiplets, can be performed by firmware stored in memory (e.g., one of the peripherals in touch and display controller 212) and executed by one or more processors (in touch and display controller 212), or stored in program storage 218 and executed by host processor 220. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the computing system 200 is not limited to the components and configuration of FIG. 2A, but can include other or additional components in multiple configurations according to various examples. Additionally, the components of computing system 200 can be included within a single device, or can be distributed between multiple devices. In some examples, PMU 214 and guard IC 216 can be integrated into a power management and guard integrated circuit. In some examples, the power management and guard integrated circuit can provide power supplies (e.g., guard referenced) and the guard signal to touch screen 204 directly rather than via touch and display IC 212. In some examples, touch and display IC 212 can be coupled to host processor 220 directly, and a portion of touch and display IC 212 in communication with chiplets 207 can be included in an isolation well (e.g., a deep N-well isolation)

referenced to the guard signal from guard IC 216. In some examples, computing system 200 can include an energy storage device (e.g., a battery). In some examples, computing system 200 can include wired or wireless communication circuitry (e.g., Bluetooth, WiFi, etc.).

As described herein, in some examples integrated touch and display module 202 can perform touch sensing operations (e.g., self-capacitance scans) in a different power domain than in the chassis power domain. In some examples, integrated touch and display module 202 can perform non-guarded touch sensing operations (e.g., mutual capacitance scans) or display operations in the chassis power domain. The optical sensing operations may be performed in either the chassis power domain or another power domain (e.g., guarded power domain), depending on the timing of the optical sensing operations.

Figures 2B, 2C:
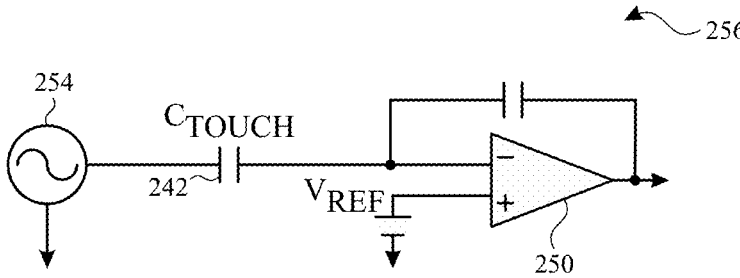
FIG. 2B illustrates an example touch sensing configuration including various associated capacitances according to examples of the disclosure.
FIG. 2C illustrates an example equivalent circuit diagram of an example touch sensing configuration according to examples of the disclosure.

FIG. 2B illustrates an example touch sensing configuration 230 including various associated capacitances according to examples of the disclosure. In configuration 230 of FIG. 2B, the touch sensing circuitry of integrated touch screen 204 can be referenced to a guard ground rather than a chassis ground. Specifically, in configuration 230 of FIG. 2B, touch sensing circuitry (e.g., sense amplifier 250) in chiplet 207 (or touch chiplet 210) can be coupled to a touch node electrode 236 by a routing trace 258. Chiplet 207 can be disposed or fabricated on a substrate including a guard ground plane 248 ("guard plane"), which can represent a virtual ground plane of touch chiplet 210 that is different from chassis ground 234 (also referred to herein as earth ground or device ground). In particular, stimulation source 254 ("guard source") disposed in in guard IC 216, for example, can be referenced to chassis ground 234, and can output a guard voltage (e.g., a guard stimulation signal, such as a square or trapezoid wave) that can establish the voltage at guard plane 248. In this manner, the guard plane 248 acting as a guard ground for chiplet 207 can be referenced to the guard voltage. Because chiplet 207 can be mounted on a substrate including guard plane 248, the sense amplifier in chiplet 207 can be referenced to the guard signal (and receive other guard-referenced voltages produced by PMU 214, for example), and can be isolated from chassis ground 234 by guard plane 248. In this way, chiplet 207 (or touch chiplet 210) can operate in the guard power domain, whereas the guard source 254 (e.g., in guard IC 216) can operate in the chassis power domain. Guard plane 248 can be any conductive material of a substrate on which chiplet 207 can be disposed or fabricated (e.g., silver, copper, gold, etc.). For example, chiplet 207 may be assembled on a printed circuit board (PCB), and may be referenced to the PCB ground plane 248 driven, during guarded self-capacitance scans, by guard source 254. Guard source 254 can be implemented, for example, using a waveform generator (e.g., generating arbitrary waveforms, such as a square wave referenced to chassis ground 234) whose output can be inputted in to a digital-to-analog converter (DAC). Analog output from the DAC can be provided to a linear buffer (e.g., with unity or some other gain) whose output can correspond to the output of guard source 254.

Additionally, guard plane 248 can be disposed between touch node electrode 236 and chassis 232 (or, more generally, chassis ground 234), and guard plane 248 can be disposed between a routing trace that couples touch node electrode 236 to chiplet 207 and chassis 232 (or, more generally, chassis ground 234). Thus, guard plane 248 can similarly isolate touch node electrode 236 and routing trace 258 that couples touch node electrode 236 to chiplet 207 from chassis ground 234. Guard plane 248 can reduce or eliminate parasitic or stray capacitances that may exist between touch node electrode 236 and chassis ground 234, as will be described below. Optionally, a guard plane can be included in a layer above the touch node electrodes and/or between touch node electrodes (e.g., as illustrated by guard plane 252) and can be referenced to the same guard voltage. Guard plane 252 can include openings corresponding to touch node electrodes to enable detection of touch activity on the touch sensor panel (or proximity activity) while guarding the touch node electrodes and routing from stray capacitances that can form due to a touch or other stray capacitances. In some examples, the material(s) out of which guard planes 248 and 252 are made can be different. For example, guard plane 252 above the touch node electrodes can be made of ITO, or another fully or partially transparent conductor), and guard planes 248 in the substrate (e.g., PCB) can be made of a different conductor, such as copper, aluminum, or another conductor that may or may not be transparent.

Various capacitances associated with touch and/or proximity detection using configuration 230 are also shown in FIG. 2B. Specifically, an object 238 (e.g., a finger) can be in touching or in proximity to touch node electrode 236. Object 238 can be grounded to earth ground 234 through capacitance 240 (e.g., $C_{body}$), which can represent a capacitance from object 238 through a user's body to earth ground 234. Capacitance 242 (e.g., $C_{touch}$) can represent a capacitance between object 238 and touch node electrode 236, and can be the capacitance of interest in determining how close object 238 is to touch node electrode 236. Typically, $C_{body}$ 240 can be significantly larger than $C_{touch}$ 242 such that the equivalent series capacitance seen at touch node electrode 236 through object 238 can be approximately $C_{touch}$ 242. Capacitance 242 can be measured by touch sensing circuitry (e.g., sense amplifier 250) included in chiplet 207 (or touch chiplet 210) to determine an amount of touch at touch node electrode 236 based on the sensed touch signal. As shown in FIG. 2B, touch sensing circuitry in chiplet 207 can be referenced to guard ground (with some DC biasing provided by the chiplet 207 and/or PMU 214). In some examples, capacitance 244 (e.g., $C_p$) can be a parasitic capacitance between touch node electrode 236 and guard plane 248. Capacitance 246 (e.g., $C_s$) can be a stray capacitance between routing trace 258 coupled to touch node electrode 236 and guard plane 248, for example. In some examples, the impact of capacitances 244 and 246 on a sensed touch signal can be mitigated because guard plane 248 and touch sensing circuitry in chiplet 207 are all referenced to the virtual ground signal produced by guard source 254 during a guarded self-capacitance scan.

When guarded, the voltage at touch node electrode 236 and trace 258 can mirror or follow the voltage at guard plane 248, and thereby capacitances 244 and 246 can be reduced or eliminated from the touch measurements performed by chiplet 207 (or touch chiplet 210). Without stray capacitances 244 and 246 affecting the touch measurements, the offset in the output signal of sense amplifier 250 (e.g., when no touch is detected at touch node electrode 236) can be greatly reduced or eliminated, which can increase the signal to noise ratio and/or the dynamic range of sense circuitry in chiplet 207. This, in turn, can improve the ability of touch sensing circuitry in chiplet 207 to detect a greater range of touch at touch node electrode 236, and to accurately detect smaller capacitances $C_{touch}$ 242 (and, thus, to accurately detect proximity activity at touch node electrode 236 at larger distances). Additionally, with a near-zero offset output signal from touch sensing circuitry in chiplet 207, the effects of drift due to environmental changes (e.g., temperature changes) can be greatly reduced. For example, if the signal out of sense amplifier 250 consumes 50% of its dynamic range due to undesirable/un-guarded stray capacitances in the system, and the analog front end (AFE) gain changes by 10% due to temperature, the sense amplifier 250 output may drift by 5% and the effective signal-to-noise ratio (SNR) can be limited to 26 dB. By reducing the undesirable/un-guarded stray capacitances by 20 dB, the effective SNR can be improved from 26 dB to 46 dB.

FIG. 2C illustrates an example equivalent circuit diagram of an example touch sensing configuration 256 according to examples of the disclosure. As described herein, guarding can reduce or eliminate capacitances 244 and 246 from the touch measurements performed by touch sensing circuitry in chiplet 207. As a result, the sense amplifier 250 can simply detect $C_{touch}$ 242, which can appear as a virtual mutual capacitance between object 238 and touch node electrode 236. Specifically, object 238 can appear to be stimulated (e.g., via $C_{body}$ 240) by guard source 254, and object 238 can have $C_{touch}$ 242 between it and the inverting input of sense amplifier 250. Changes in $C_{touch}$ 242 can, therefore, be sensed by sense amplifier 250 as changes in the virtual mutual capacitance $C_{touch}$ 242 between object 238 and sense amplifier 250. As such, the offset in the output signal of sense amplifier 250 (e.g., when no touch is detected at touch node electrode 236) can be greatly reduced or eliminated, as described above. As a result, sense amplifier 250 (e.g., the input stage of touch sensing circuitry of chiplet 207) need not support as great a dynamic input range that self-capacitance sense circuitry might otherwise need to support in circumstances/configurations that do not exhibit the virtual mutual capacitance effect described here.

Because the self-capacitance measurements of touch node electrodes in self-capacitance based touch screen configurations can exhibit the virtual mutual capacitance characteristics described above, chiplet 207 can be designed with a simpler sensing architecture to support both self-capacitance measurements and mutual capacitance measurements. Various example configurations of the touch sensing circuitry for chiplet 207 (or touch chiplet 210) are described herein.

Referring back to FIG. 2A, integrated touch screen 204 can be integrated such that touch sensing circuit elements of the touch sensing system can be integrated with the display stack-up and some circuit elements can be shared between touch and display operations. It is noted that circuit elements are not limited to whole circuit components, such as a whole capacitor, a whole transistor, etc., but can include portions of circuitry, such as a conductive plate.

Figures 3A, 3B:
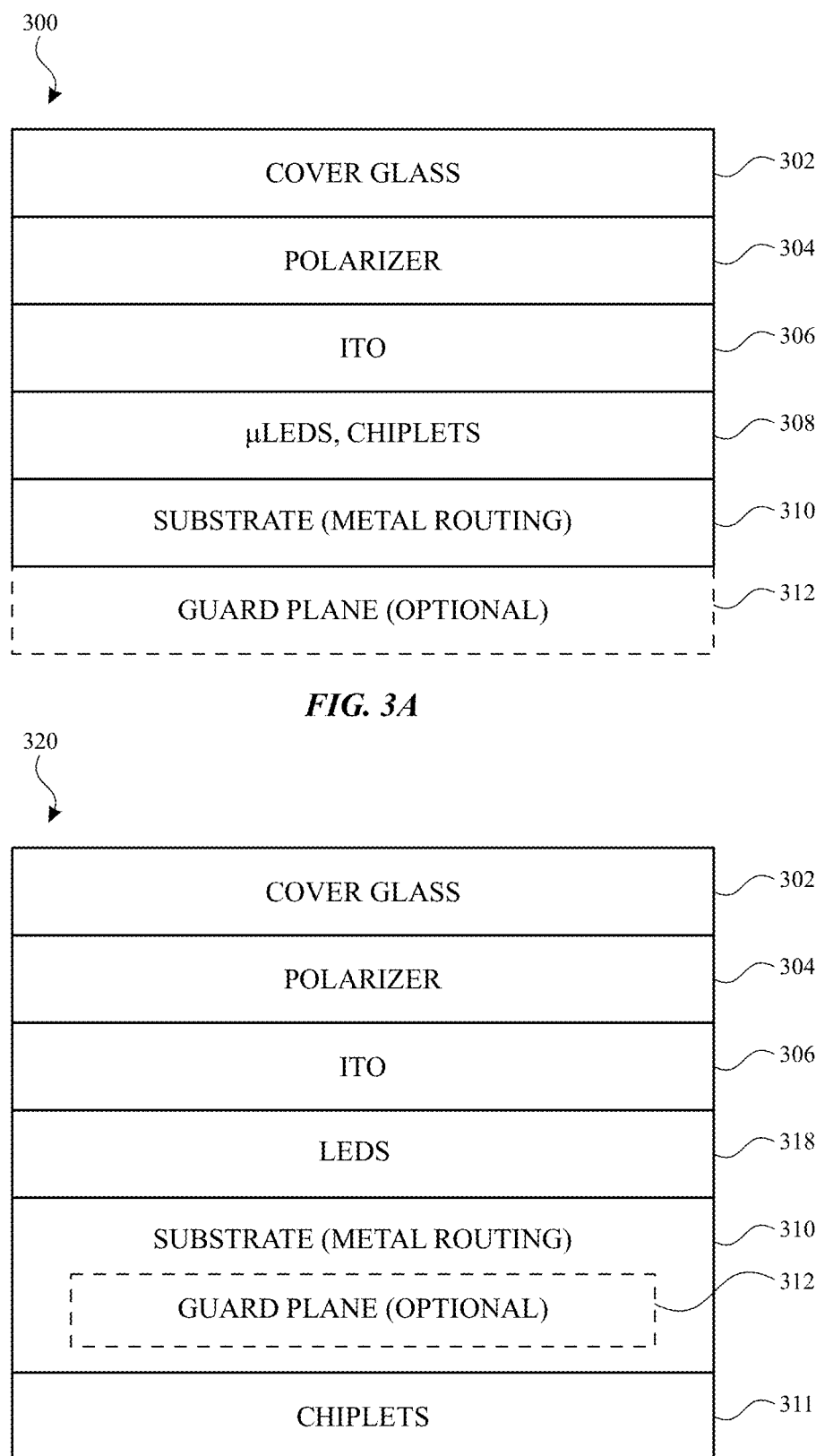
FIGS. 3A-3B illustrate example stack-ups of an integrated touch screen according to examples of the disclosure.

FIGS. 3A-3B illustrate example stack-ups of an integrated touch screen according to examples of the disclosure. FIG. 3A illustrates an example stack-up of a touch screen including chiplets (or touch chiplets and display chiplets) in the visible area of the display. Integrated touch screen 300 comprises a substrate 310 (e.g., a printed circuit board) upon which chiplets 207 (or touch chiplets 210 and/or display chiplets 208) and micro-LEDs 206 can be mounted in touch and display circuit layer 308. In some examples, the chiplets 207 and/or micro-LEDs 206 can be partially or fully embedded in the substrate (e.g., the components can be placed in depressions in the substrate). In some examples, the chiplets 207 can be mounted on one and/or both sides of substrate 310. For example, some or all of the chiplets 207 can be mounted on a second side of substrate 310 (or some or all of the touch chiplets 210 and/or some or all of the display chiplets 208 can be mounted on a second side of substrate 310). In some examples, the chiplets can be disposed on the second side of the substrate (opposite the first side of the substrate including micro-LEDs 206). FIG. 3B illustrates an example stack-up of a touch screen including chiplets (or touch chiplets and/or display chiplets) outside the visible area of the display. Unlike the stack-up of integrated touch screen 300, in which chiplets 207 and micro-LEDs 206 can be mounted in touch and display circuit layer 308, stack-up of integrated touch screen 320 can include chiplets mounted in a touch and display circuit layer 311 on a second (bottom) side of substrate 310 different than the micro-LEDs 206 mounted on in a display pixel layer 318 on a first (top, visible) side of substrate 310. In some examples, placing the chiplets on the second side of the substrate can allow for uniform spacing of the micro-LEDs and/or increased density of micro-LEDs on the first side of substrate 310.

The substrate 310 can include routing traces in one or more layers to route signals between micro-LEDs 206, chiplets 207 and touch and display controller 212. Substrate 310 can also optionally include a guard plane 312 for guarded operation (e.g., corresponding to guard plane 248 in FIG. 2B). Although illustrated on the bottom of substrate 310 in FIG. 3A, guard plane 312 can be formed as a layer of substrate 310 other than the bottom layer (e.g., as illustrated in FIG. 3B in an internal layer of substrate 310).

After mounting micro-LEDs 206 and chiplets 207 in the touch and display circuit layer 308 in FIG. 3A (e.g., during a pick-and-place assembly), a planarization layer (e.g., transparent epoxy) can be deposited over the micro-LEDs 206 and chiplets 207. The planarization layer can be deposited over the micro-LEDs 206 in the display pixel layer 318 in the stack-up of FIG. 3B. A fully or partially transparent conductor layer 306 (e.g., ITO) can be deposited above planarized touch and display circuit layer 308 in FIG. 3A or above the display pixel layer 318 in FIG. 3B. Conductor layer 306 can include a pattern of individual conductor plates that can be used for touch and display functions of integrated touch screen 300. For example, individual conductor plates can be used as cathode terminals for micro-LEDs during display operations (and/or optical sensing operations) and groups of conductor plates can form touch node electrodes for touch operations. Polarizer 304 can be disposed above the transparent conductor layer 306 (optionally with another planarization layer disposed over the transparent conductor layer 306). Cover glass (or front crystal) 302 can be disposed over polarizer 304 and form the outer surface of integrated touch screen 300. The stack-up of integrated touch screens 300 and/or 320 can provide numerous benefits including reduced costs (e.g., due to simplified assembly of devices including integrated touch and display module 202 and a reduced number of integrated circuits by combining touch and display functionality into integrated touch and display controller 212), reduced stack-up height (sharing conductors eliminates a separate touch node electrode layer; integrating chiplets 207 (or touch chiplets 210 and display chiplets 208) into the stack-up on the same layer with the micro-LEDs does not add to the stack-up height for FIG. 3A), simplified support for guarded self-capacitance scans (by including touch circuitry 213 on integrated touch and display module 202 with a guard plane extending throughout the substrate of integrated touch and display module 202), and shrinking the border region around the touch screen (because routing can be done through the substrate rather than in the border regions).

Figures 4, 5:
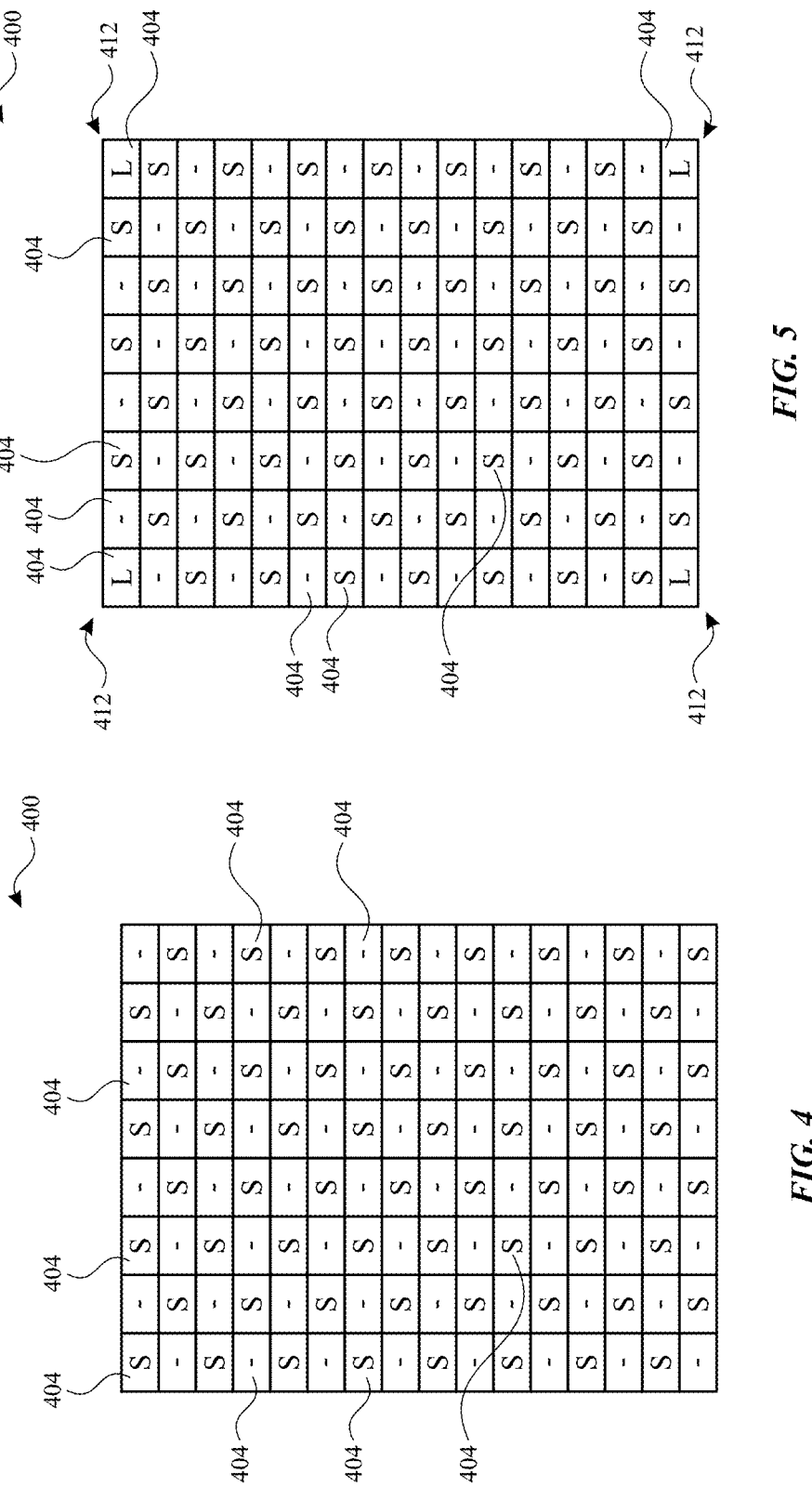
FIG. 4 illustrates an example configuration of chiplets of a touch sensor panel according to examples of disclosure.
FIG. 5 illustrates an example configuration of chiplets of a touch sensor panel according to an example of disclosure.

FIG. 4 illustrates an example configuration of chiplets of a touch sensor panel 400 according to an example of disclosure. In some examples, touch sensor panel 400 can be coupled to display to form an integrated touch screen, such as touch screens 124, 126, 128, 130 and 152, previously described. In some examples, touch sensor panel 400 can operate without a corresponding display. Touch sensor panel 400 can includes a plurality of touch electrodes, such as touch node electrodes 236, previously described. As such, the touch electrodes can be configurable for mutual capacitance or self-capacitance sensing or a combination of mutual and self-capacitance sensing. For example, in one mode of operation, touch electrodes can be configured to sense mutual capacitance between touch electrodes, and in a different mode of operation, touch electrodes can be configured to sense self-capacitance of touch electrodes. In some examples, some of the touch electrodes can be configured to sense both mutual capacitance therebetween and some of the touch electrodes can be configured to sense self-capacitance thereof.

The touch sensor panel 400 can comprise a plurality of chiplets 404 coupled to the touch electrodes. Touch sensor panel 400 is illustrated as an array of chiplets 404 wherein each chiplet of the array corresponds to a region of the touch sensor panel that can includes multiple touch electrodes. Chiplets 404 can be the same or similar to chiplets 207, described above, for example. As such, chiplets 404 can be configured to operate in a touch sensing configuration (e.g., as represented by touch-sensing chiplets labeled "S") whereby the sensing circuitry of the chiplet measures capacitance using the touch electrodes in the region. For example, chiplets 404 configured to operate in touch sensing configuration can perform touch sensing by sensing capacitance at the touch electrodes located in the regions of the touch panel corresponding to the chiplets. Chiplets 404 can also be configured to operate in light-sensing configuration to perform optical sensing (as represented by light-sensing chiplets labeled "L" in FIG. 5), as will be described further in this disclosure. Touch sensor panel 400 can further include processing circuitry and/or sensing circuitry coupled to the plurality of chiplets, such as touch circuitry 213, previously described. Additionally, it is understood that although touch sensing chiplets are shown with an "S" representing sensing, that these chiplets are also configured to be driven to support self-capacitance sensing (e.g., using stimulation source 254). Additionally, it is understood that mutual capacitance touch sensing can be achieved using some touch sensing chiplets configured for sensing and some touch sensing chiplets configured for driving. For example, one chiplet 404 in a pair of chiplets 404 shown with an "S" can be configured for driving, and one chiplet 404 in a pair of chiplets 404 shown with an "S" can be configured for sensing mutual capacitance therebetween. Alternatively, chiplets 404 shown with an "S" can be configured for sensing and adjacent chiplets can be configured for driving (e.g., instead of being disabled chiplets represented by the dash symbol "-").

The touch sensor panel 400 in FIG. 4 shows a non-light sensing panel configuration. As shown, a plurality of chiplets 404 is set in a touch sensing configuration, without chiplets configured for light-sensing. For example, the chiplets 404 of the touch sensor panel 400 are configured for touch sensing (e.g., touch-sensing chiplets) or disabled (e.g., not operational and therefore performing neither touch sensing operation nor light sensing operation). Touch-sensing chiplets are represented by the letter "S" and disabled chiplets are represented by the dash symbol "-". In some examples, each region of touch electrodes is measured by a chiplet configured for touch sensing operations, and no chiplets 404 of the plurality of chiplets is configured for light sensing. A non-light sensing panel configuration can be used in a touch operation mode of the touch sensor panel 400 where the monitoring of ambient light is not required or desired. For example, a non-light sensing panel configuration can be employed when the touch sensor panel 400 is operating in a touch operation mode that is non-light-sensitive. Instead chiplet use can be dedicated to touch sensing for a faster or more complete/higher-resolution touch sensing of the entire touch sensor panel 400. As described herein, a non-light-sensitive touch operation mode refers to a touch sensing mode that is not susceptible or is less susceptible to error in touch sensing due to ambient light incident on the touch sensor panel 400. For example, a non-light-sensitive touch operation mode has less induced error due to light compared with a light-sensitive touch operation mode. In some examples, a non-light-sensitive touch operation mode has less than a threshold amount of error (e.g., 0.1%, 0.5%, 1%, 2%, etc.) due to light sensitivity. It is understood that the non-light sensitive touch operation mode can also be understood in relevant terms among the touch operation modes available for the device, where a non-light sensitive touch operation mode is the least affected the touch operation mode, in which the touch sensing operations function without the need to discard touch sensing results.

FIG. 5 illustrates an example configuration of chiplets 404 of a touch sensor panel 400 according to an example of disclosure. The touch sensor panel 400 of FIG. 5 shows a light-sensing panel configuration. Unlike the panel configuration of FIG. 4, which shows a non-light-sensing panel configuration, in this configuration of the touch sensor panel 400, one or more chiplets 404 are configured to perform light sensing (e.g., light-sensing chiplets). Chiplets configured for light-sensing are represented by the letter "L". A light-sensing panel configuration can be used for a touch operation mode of the touch sensor panel 400 where the monitoring of ambient light is required or desired. For example, a light sensing panel configuration can be employed when the touch sensor panel 400 is operating in a touch operation mode that is light-sensitive. As described herein, a light-sensitive touch operation mode refers to a touch sensing mode that is susceptible or is more susceptible to error in touch sensing due to light incident on the touch sensor panel 400. For example, a light-sensitive touch operation mode has more induced error due to light compared with a non-light-sensitive touch operation mode. In some examples, a light-sensitive touch operation mode has more than a threshold amount of error (e.g., 0.1%, 0.5%, 1%, 2%, etc.). In some examples, chiplets configured to operate in light-sensing configuration can perform light sensing (optical sensing) by sensing light (e.g., ambient light or light from specific light sources) at one or more of the regions of the touch sensor panel corresponding to the chiplets. In some examples, chiplets configured for light sensing can sense light using light emitting diodes of the display (e.g., photocurrent generated by ambient light) in a light sensing configuration or one or more dedicated photodetectors coupled to the light-sensing chiplets and located at one or more regions of the touch sensor panel corresponding to the light-sensing chiplets. In some examples, the light detectors can include photodetectors configured to detect ultraviolet, infrared, or near-infrared light. In some examples, the chiplets 404 can be configured for concurrent touch sensing and optical sensing. Touch sensor panel 400 can thus be configured to simultaneously sense capacitance at a region (e.g., using touch-sensing chiplets coupled to some of the touch node electrodes of each of the regions and configured to operate in a touch sensing configuration) and sense ambient light at the region (e.g., using light-sensing chiplets coupled to light emitting diodes of the display, one or more dedicated photodetectors, etc. of each of the regions and configured to operate in an optical sensing configuration). It is understood that the terms "touch-sensing chiplet" and "light-sensing chiplet," respectively, refer to the configurations of chiplet 404 configurable for touch sensing and/or light sensing, and that a touch-sensing chiplet (labeled "S") can be subsequently configured for light sensing (becoming a light-sensing chiplet (labeled "L") and that a light-sensing chiplet can be configured for touch sensing (thus becoming a touch-sensing chiplet). It is further understood that any one of the chiplets 404, such as touch-sensing chiplet (labeled as "S" in FIGS. 4-5) and/or light-sensing chiplet (labeled "L" in FIG. 5) can be disabled (e.g., not operational and therefore performing neither touch sensing operation nor light sensing operation), thus becoming disabled chiplet. Additionally, disabled chiplets (labeled as "-") can be enabled to perform touch sensing operation (driving or sensing aspects) or light sensing operation.

In some examples, the light-sensing chiplets (e.g., chiplets 404 configured for light sensing) can use various light sensing techniques including photovoltaic light sensing or photoconduction light sensing. Additionally, the photoconduction light sensing can operate in an alternating current (AC) mode, a direct current (DC) mode, or both. In some examples, light-sensing chiplets can be configured to sense light in an AC mode using a modulation frequency applied to a mixer at the output of a sense amplifier of the chiplet (with the input of the sense amplifier connected to the photodiode or photodetector). In some examples, light-sensing chiplets can be configured to sense light in a DC mode using a constant demodulation signal or bypassing the mixer at the output of the sense amplifier.

The processing circuitry of the system (e.g., touch and display controller 212, touch circuitry 213) can configure chiplets 404 to perform optical sensing (e.g., as light-sensing chiplets) to measure ambient light incident in on the touch sensor panel 400. The touch sensor panel 400 can use the ambient light measurements to perform a variety of functions such as regulating display brightness for a touch screen that includes the touch sensor panel 400. Ambient light measurement enabled by the chiplets configured for optical sensing can also provide various components of the touch sensor panel 400, or touch screen and/or electronic display that include the touch sensor panel (e.g., touch sensing circuitry, display circuitry) with awareness of lighting conditions during touch sensing. For example, touch sensing circuitry (e.g., chiplets without light-blocking packaging) can be sensitive to light, which can interfere with touch sensing results (e.g., introducing error into the touch signal). Ambient light measurements can be used by the touch sensing circuitry to evaluate the lighting conditions for possible interference and determine whether touch sensing results should be discarded, compensated for light-induced error, or transmitted for further touch processing as received (without compensation). In some examples, the processing circuit can use the ambient light measurements to adjust the touch sensing results to compensate the touch signals affected by the ambient light incident on touch circuitry. Compensating for light-induced errors can improve accuracy of the touch sensing results. In some examples, the processing circuitry can activate or deactivate chiplets for optical sensing based on the ambient light measured by the chiplets currently configured for optical sensing.

In some examples, such as shown in FIG. 5, a minority of the chiplets 404 is configured for optical sensing (e.g., fewer light-sensing chiplets than touch-sensing or deactivated chiplets. In some examples, one chiplet is configured for optical sensing. In some examples, two-four chiplets are configured for optical sensing. Additionally or alternatively, the chiplets configured for optical sensing (labelled "L") can be spaced apart across the touch sensor panel 400 such that each light-sensing chiplet is separated from the nearest light-sensing chiplet by multiple intervening chiplets that are touch-sensing chiplets or switched off chiplets (e.g., the number of intervening chiplets can be 2, 5, 10, 20, 50, 100, or correspond to the number of chiplets along an axis of the touch sensor panel). Spacing light-sensing chiplets (labelled "L") across the touch sensor panel 400 helps preserve exposure of at least some of the light-sensing chiplets to ambient light for measurement by reducing the risk of obstruction of all the light-sensing chiplets during touch sensing (e.g., by the user's finger, hand, wristband, sleeve, or any another part or accessory of the user during contact with the touch sensor panel). Positioning the light-sensing chiplets apart (e.g., the regions of the touch sensor panel corresponding to the light-sensing chiplets) therefore can help ensure that at least one light-sensing chiplet remains unobstructed during touch sensing.

In some examples, the chiplets configured for optical sensing (e.g., light-sensing chiplets labelled "L") are disposed in the corners 412 of the touch sensor panel (e.g., within a threshold distance of a corner 412, such as within a distance corresponding to 1, 2, 3, 4, or 5 widths of a chiplet). Configuring corner chiplets for optical sensing instead of touch sensing may be desirable as corner inputs to the touch screen are typically less common. Thus, the light sensing operation at the corners is unlikely to affect touch sensing as touch inputs are less likely to be directed to the corners the touch sensor panel 400. Additionally or alternatively, the placement of the light-sensing chiplets in the corners 412 minimizes the risk of obstruction of the ambient light to light-sensing regions (e.g., the regions corresponding to the light-sensing chiplet, which are the corners) during touch input. For example, for a touch sensor panel 400 having four corners 412 such as used as part of touch screens 124, 126, 128, 130 and 152, described above, a finger operating the touch sensor panel (e.g., providing touch input) is unlikely to obstruct all four corners 412 of a touch screen (and therefore the touch sensor panel 400). In some examples, a single chiplet, a pair of chiplets, or a plurality of chiplets in each of one or more corners 412 of the touch sensor panel 400 can be configured for optical sensing (e.g., as light-sensing chiplets labeled "L"), while the remainder of the chiplets 404 across the touch sensor panel 400 comprises touch-sensing chiplets (labeled "S") or chiplets in an off state (labeled "-").

Additionally or alternatively, the chiplets configured for light sensing can also be disposed in other locations than the corners of the touch sensor panel 400, in some examples (e.g., the touch sensor panel can exhibit other configurations). For example, light-sensing chiplets can be located along the one or more edges around the perimeter of the touch sensor panel 400 (e.g., at midpoints of the edge), which can provide similar advantages as the corner location of the light-sensing chiplets as described above, namely that their location away from the regions of the touch sensor panel 400 more likely to receive touch input. Additionally or alternatively, such a location minimizes the possibility of interference from the user's finger or the input device (e.g., a stylus) with the sensing of ambient light at the edges during touch input. In some examples, one or more light-sensing chiplets can be disposed in the interior of the panel (e.g., not the edges of the panel) and/or at or near the center of the touch sensor panel 400 (e.g., within a threshold distance of the center). In some examples, light-sensing chiplets can be disposed across the touch sensor panel 400 according to a pattern.

As described herein, the processing circuitry can set the panel configuration of the touch sensor panel (e.g., selectively configure chiplets 404 for touch sensing or light sensing or deactivate the chiplets) based on the touch operation mode of the touch sensor panel 400. In some examples, the processing circuitry can determine that the touch operation mode of the touch sensing panel is not light-sensitive. As referred to herein, a touch operation mode is light-sensitive when ambient light incident on the touch sensor panel 400 (and incident on the chiplet configured for touch sensing) can affect the operation of the touch sensor panel 400 by introducing a threshold amount of error (e.g., outside of the error tolerance specified for touch sensing operations). For example, components of the touch sensor panel 400 such as the touch sensing circuitry, can be affected by the incidence of ambient light on the circuitry, which can disrupt touch sensing and cause errors in touch results.

Figures 6, 7:
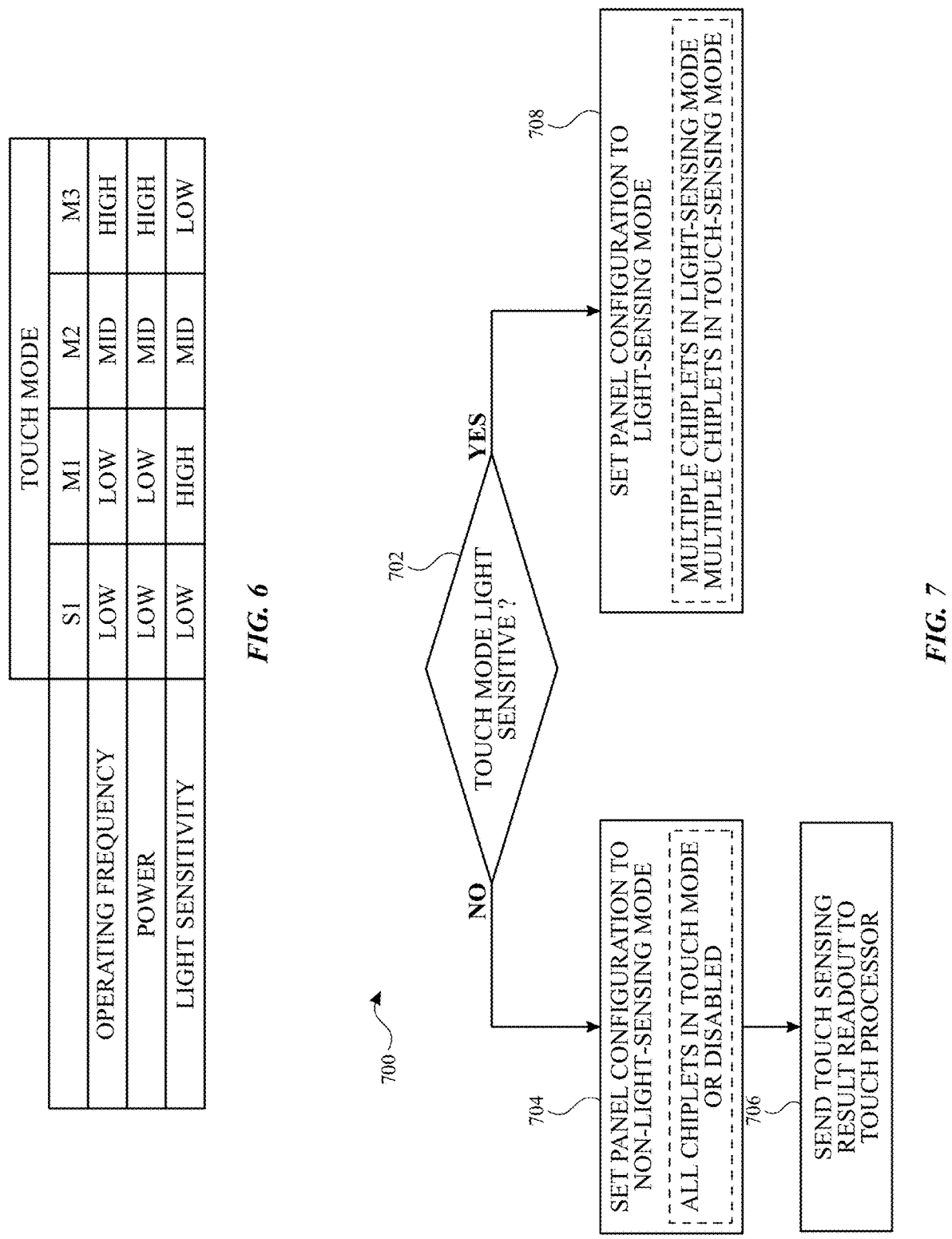
FIG. 6 illustrates a table of example touch sensing modes or touch operation modes of the touch sensor panel according to examples of the disclosure.
FIG. 7 illustrates a flow diagram for an example process for mitigating ambient light interference according to examples of the disclosure.

FIG. 6 illustrates a table of example touch sensing modes or touch operation modes of the touch sensor panel 400 according to examples of the disclosure. The touch modes including a self-capacitance mode ("S1") and mutual capacitance modes, including a mutual capacitance mode with a first operating frequency ("M1"), a mutual capacitance mode with a second operating frequency ("M2"), and a mutual capacitance mode with a third operating frequency ("M3"). The touch modes use a letter S or M to represent self-capacitance versus mutual capacitance, and a number to represent an operating frequency. It is understood that more or fewer operating frequencies can be employed. The table uses "Low," "Mid," and "High" to designate relative characteristics for each of these modes.

In some examples, a self-capacitance mode S1 (e.g., where chiplets 404 are configured to perform self-capacitance touch sensing at the touch electrodes) is a non-light-sensitive touch operation mode. The touch sensor panel 400 has relatively less sensitivity (or no sensitivity) to ambient light when the panel operates in a self-capacitance mode such as S1 as compared with other touch sensing modes. For example, the interference caused by ambient light incident on the touch sensor panel operating in self-capacitance mode is less than a threshold interference, thereby preserving touch sensor panel performance. In some examples, the self-capacitance mode is used when the electronic device is in a relatively lower power state and therefore operates with a modulation frequency of the stimulation signal and a demodulation frequency of the touch sensing circuitry below a threshold (e.g., a relative low operating frequency). The relatively low operating frequency for touch sensing therefore allows the scan to be relatively lower power. However, it is understood that when multiple self-capacitance modes (e.g., other than S1, such as S2, S3, etc.) are available on the touch sensor panel 400, one of these modes with a relatively low operating frequency can exhibit light-induced error outside of the touch sensor panel specification (e.g., because light-induced drift is less rejected with lower operating frequency or for other reasons), that some such self-capacitance modes can be considered light-sensitive modes.

In some examples, one or more mutual capacitance modes can be used, which have different relative levels of sensitivity to light. Mutual capacitance modes are denoted by the designation M1, M2, and M3 in FIG. 6. In mutual capacitance modes, chiplets 404 are configured to perform mutual capacitance touch sensing between the touch electrodes (e.g., using one chiplet for driving and one chiplet for sensing). In some examples, multiple mutual capacitance modes (e.g., M1-M3) are available on the touch sensor panel 400. The mutual capacitance modes can be characterized by an operating frequency, such as the modulation frequency of the stimulation signal and the demodulation frequency of the sensing circuitry during touch sensing operations. Multiple mutual capacitance modes enable the system to change frequency characteristics used for modulation and demodulation to avoid electromagnetic noise interference in the environment or from other circuitry in a device including the touch sensor panel. M1 can be a relatively low frequency mutual capacitance mode, M3 can be a relatively high frequency mutual capacitance mode, and M3 can be a mutual capacitance mode with a frequency between M1 and M3. In some examples, the operating frequencies for modes M1-M3 are between 50 kHz and 1 MHz. In some examples, operating frequencies for modes M1-M3 have a modulation/demodulation frequency between 100 kHz±20 kHz and 400 kHz±20 kHz. In some examples, the light sensitivity of a mutual capacitance mode of operation can depend on the operating frequency for mutual capacitance touch sensing. In some examples, the light sensitivity of a mutual capacitance mode with a relatively low operating frequency has relatively high light sensitivity, whereas a mutual capacitance mode with a relatively high operating frequency has a relatively low light sensitivity. Accordingly, in relatively low frequency mutual capacitance modes (e.g., M1 and in some examples, M2), light sensitivity can be such that touch results received when the touch sensor panel is subject to performance degradation due to touch error unless the system discards or compensates for the results. In some examples, as will be described further below, the system can transition the touch sensor panel 400 to a less light-sensitive touch operation mode when detected light intensity corresponds to an excessive level of touch errors. The system can transition the touch sensor panel 400 to a less light-sensitive touch operation mode with or without compensating for touch result errors, in some examples. Further, in some examples, the power consumption of the touch sensor panel 400 in mutual capacitance mode can also depend on the operating frequency (e.g., modulation/demodulation) frequency. For example, the power consumption can increase with an increase in the operating frequency such that a mutual capacitance mode with a relatively low frequency has relatively low power consumption, whereas a mutual capacitance mode with a relatively high frequency has a relatively high power consumption.

Figure 9:
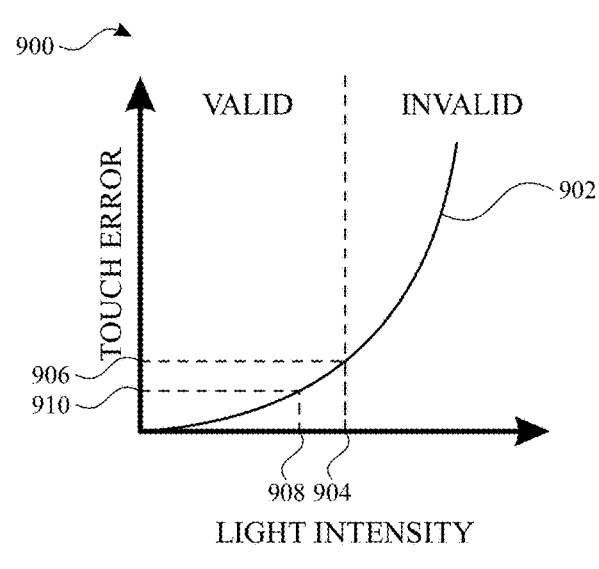
FIG. 9 illustrates a plot of light-induced touch error in readouts of an example of the touch sensor panel in a light-sensing configuration according to examples of the disclosure.

As previously described, ambient light incident on the touch sensor panel can interfere with touch sensing and generate erroneous touch results. The degree of light interference with touch sensing can vary based on the touch operation mode of the touch sensor panel. As summarized in the examples in the table of FIG. 6, in some examples, to reduce light-induced touch error the operating frequency can be increased for mutual capacitance touch sensing or self-capacitance touch sensing can be used (e.g., S1 and M3). However, increasing the operating frequency increases power consumption. Additionally, applying compensation to touch sensing results can include some additional power consumption over non-compensation. In some examples, as described herein, the system can monitor lighting conditions to determine which operating mode to use, which touch sensing results to use, and/or which touch sensing results to compensate before using. The system can balance for power consumption and for touch performance. For example, the touch sensor panel can be characterized for light sensitivity on a product basis or on a per unit basis to identify the operating modes that are to be consider light sensitive (whereby mitigations are required) or non-light-sensitive (whereby mitigations are not required). The characterization can also be used to generate a curve of light-induced touch error as a function of light level (an example of which is shown in FIG. 9), which can be used for compensation and/or determining whether one or more mitigations are required. When operating under conditions in which light-induced error is above a threshold, such as when operating in relatively low frequency mutual capacitance mode in a bright environment, the examples of the present disclosure provide solutions for mitigating ambient light interference with a touch sensor panel 400. The mitigations can include monitoring the ambient light measured by the light-sensing chiplets and discarding touch results when touch error is above a threshold based on the lighting conditions, compensating touch results for the light-induced touch error (optionally dependent on whether the touch error is above a threshold based on the lighting conditions), and/or transitioning the touch operation mode of the touch sensor panel to a less light-sensitive mode when appropriate.

FIG. 7 illustrates a flow diagram 700 for an example process for mitigating ambient light interference according to examples of the disclosure. At operation 702, the system (e.g., touch controller or other processing circuitry of the touch sensor panel 400) determines whether the touch sensor panel 400 is operating in a light-sensitive touch operation mode or non-light-sensitive touch operation mode. In some examples, such as illustrated in FIG. 6, light-sensitive touch operation modes include S1 and M2 modes and non-light-sensitive touch operation modes include M1 and M3 modes. In some examples, when the touch sensor panel is operating in a non-light-sensitive touch operation mode (e.g., S1, M3), the system, at operation 704, can set or switch the panel configuration of the touch sensor panel 400 to a non-light-sensing configuration, such as a configuration where chiplets 404 of the plurality are either configured for touch-sensing operations or deactivated, such as described above and illustrated in FIG. 4, without configuring some of chiplets 404 for light-sensing operations. At operation 706, in the non-light-sensing configuration, the system performs touch sensing at the plurality of chiplets, and chiplets 404 can send touch sensing readouts to the touch processor (or other processing circuitry).

Referring back to operation 702, when the system is operating in a light-sensitive touch operation mode (e.g., M1 or M2), the system at operation 708 can set or switch the panel configuration of the touch sensor panel to a light-sensing configuration, such as a configuration where some chiplets (e.g., chiplets labeled "S" or pair of chiplets that are driving or "labeled S" for sensing) of the plurality of chiplets 404 are configured for touch-sensing operations and some chiplets (e.g., chiplets labeled "L") of the plurality of chiplets 404 are configured for light-sensing operation, as will be further described below. Such a configuration enables concurrent (or at least partially concurrent) touch sensing operations and light-sensing operations. The touch sensing results readouts can be sent to the touch processor (e.g., operation 706) and the light sensing readouts can be sent to processing circuitry for use in processes 800, 1000, or 1100, for example.

Referring back to operation 704, in some examples, the non-light-sensing panel configuration can include one or more chiplets configured for light-sensing (e.g., not all chiplet are configured for touch sensing or are disabled when the touch sensor panel 400 is in non-light-sensing mode). More generally, the touch sensor panel in a non-light sensing configuration (e.g., at operation 704) can include fewer light-sensing chiplets than the touch sensor panel in a light-sensing configuration (e.g., at operation 708). In some examples, the non-light-sensing panel configuration can use the same number of light-sensing chiplets as the light-sensing panel configuration, but light sensing chiplets in the non-light-sensing panel configuration decrease a light sensing frequency (e.g., light intensity scan rate or light intensity sampling rate) in the non-light-sensing configuration relative to a light sensing frequency of the light-sensing panel configuration. In some examples, the light sensing frequency can be relative to (e.g., a function of) the touch sensing frequency, such that the touch sensor panel 400 can conduct light sensing with each touch scan, or every other touch scan, or every 4 touch scans, or every 10 touch scans, and so on, for example. In such examples, in the non-light-sensing panel configuration, the system can reduce the frequency of light sensing relative to the frequency of the light sensing in the light-sensing panel configuration. In some examples, in the non-light-sensing panel configuration, the system can both reduce the frequency of light sensing and the number of light-sensing chiplets relative to the light-sensing configuration. It is understood that conversely, when the system switches the touch sensor panel 400 to a light-sensing configuration (e.g., operation 708), the system can increase the number of light sensing chiplets and/or increase the light sensing frequency relative to the non-light-sensing configuration.

Figure 8:
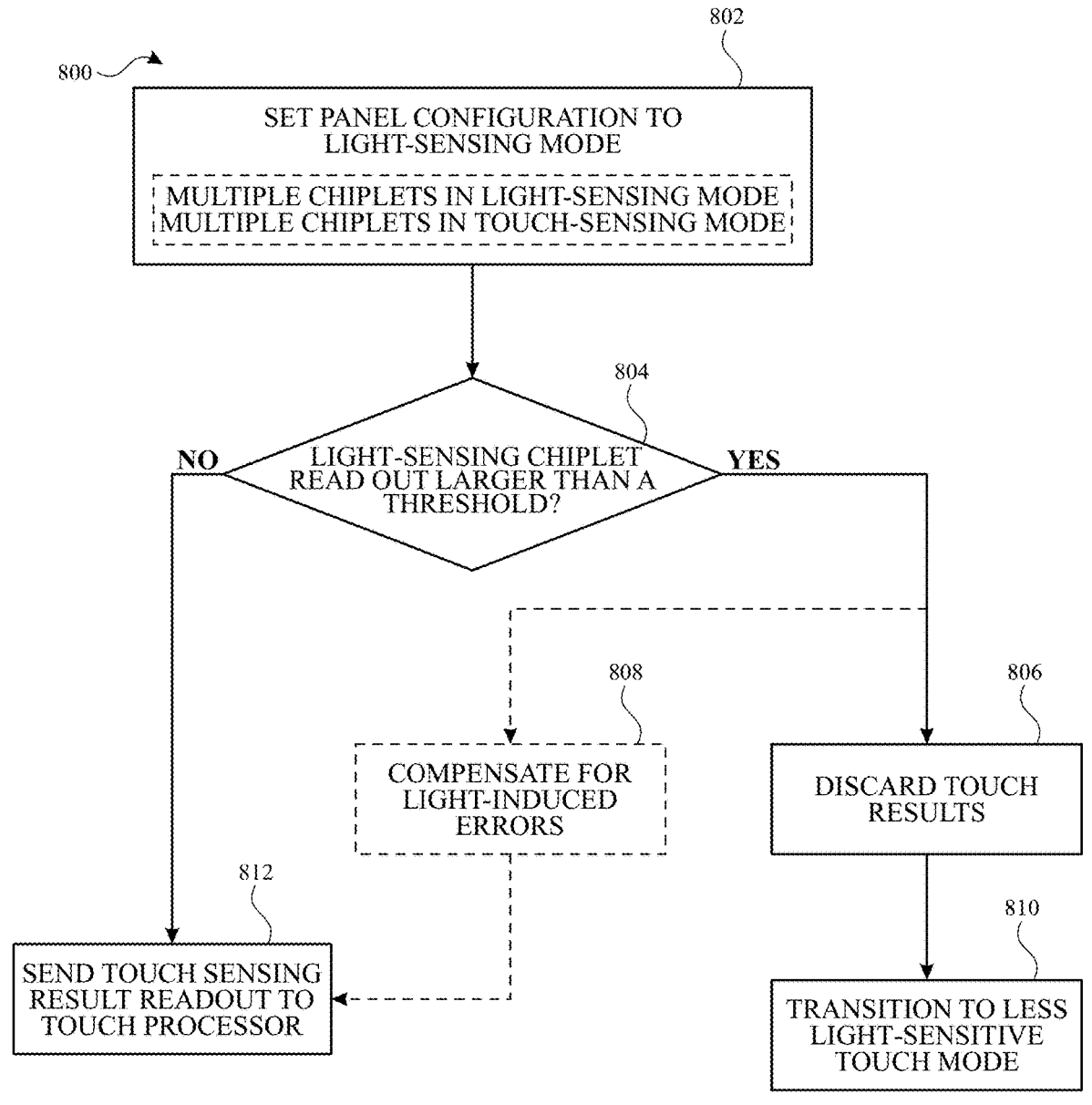
FIG. 8 illustrates a flow diagram of an example operation of the touch sensor panel in a light-sensitive touch operation mode according to examples of the disclosure.

FIG. 8 illustrates a flow diagram of process 800 of an example operation of the touch sensor panel 400 in a light-sensitive touch operation mode according to examples of the disclosure. The touch sensor panel 400 can operate in a relatively light-sensitive touch operation mode, for example, to reduce power consumption, when touch sensing accuracy requirements are reduced, and/or when less sensitive to environmental interference (e.g., when lighting intensity is less than a threshold). In some examples, when operating in relatively light-sensitive touch operation mode, ambient light can interfere with touch sensing circuitry and cause erroneous touch sensing results. As described above, with respect to FIG. 7 at operation 708, and shown again in operation 802, the system can operate or switch to operating the touch sensor panel in a light-sensing panel configuration such as a configuration where some chiplets (e.g., chiplets labeled "S") of the plurality of chiplets 404 are configured for touch-sensing operations and some chiplets (e.g., labeled "L") of the plurality of chiplets 404 are configured for light-sensing operation, such as described above and illustrated in FIG. 5). Chiplets configured for light-sensing operation can monitor environmental lighting conditions (e.g., the ambient light, other lights sources), which can provide an indication of whether touch sensing operations may be affected by error induced by the light (e.g., causing the touch sensor panel to operate outside of specification), and in accordance with a determination that light detected by one or more light detectors coupled to the chiplets configured for the light sensing operation meets one or more criteria, optionally the system can adjust the operation of the touch sensor panel 400 to mitigate reduced performance of the touch sensor panel 400 by discarding touch sensing results, compensating touch sensing results, and/or changing a type (e.g., mutual capacitance to self-capacitance) and/or characteristic (e.g., higher stimulation frequency) of touch sensing operation when the one or more criteria include a criterion that is satisfied when ambient light is excessive (e.g., ambient light conditions correspond to greater than a threshold amount of error (e.g., 0.1%, 0.5%, 1%, etc.) without these mitigations and/or adjustments.

When the touch sensor panel is operating in a light-sensitive touch operation mode (e.g., M1 and M2) with the light-sensing panel configuration (e.g., having one or more chiplets (labeled "L" in FIG. 5) configured to sense light), the system can monitor the level of light intensity detected by the light-sensing chiplets. The system can employ various techniques to determine the intensity of the ambient light (e.g., the light intensity) based on the light intensities measured by individual light-sensing chiplets of the touch sensor panel 400. In some examples, the light intensity as measured by the touch sensor panel 400 in light-sensing configuration to determine the validity of touch results can comprise an aggregate of the light intensities measured by individual light-sensing chiplets. In some examples, the light intensity is a weighted or unweighted average of the light intensities measured by individual light-sensing chiplets. In some examples, the light intensity is the light intensity output of the light-sensing chiplet with the highest or strongest measurement among the plurality of light-sensing chiplets. In some examples, one or more outlier measurements among the plurality of light-sensing chiplets can be excluded from the determination of light intensity (e.g., excluding measurements from a light-sensing chiplet when obstructed).

The light intensity measured during (or within a threshold period of time of) the light-sensitive touch operation mode can be a proxy for the degree of light interference with touch sensing, and therefore an indicator of the reliability of the touch sensing results. FIG. 9 illustrates a plot 900 of light-induced error in touch sensor panel readouts of an example of the touch sensor panel 400 in a light-sensing configuration based on light intensity according to examples of the disclosure. Plot 900 includes a curve 902 representing light-induced touch error. The y-axis corresponds to touch error from a touch-sensing chiplet and the x-axis corresponds to the light intensity measured by the light-sensing chiplets. As illustrated, touch error increases as the light intensity measured by the touch sensor panel 400 increases. It is understood that the curve 902 shown in FIG. 9 is an example of a relationship between touch error and light intensity, but that the relationship between touch error and light intensity can be different than shown. The relationship can be characterized for the device (e.g., in simulation, empirical study, at manufacture or device calibration, etc.). In some examples, the relationship can be linear. In some examples, the relationship can be non-linear (e.g., parabolic, polynomial function, asymptotic, etc.). FIG. 9 further illustrates a point on curve 902 corresponding to light intensity threshold 904 and touch error threshold 906 specified for the touch sensor panel 400. The touch error threshold 906 represents the degree of touch error above which the touch results are considered unreliable and therefore invalid or in need of compensation. Correspondingly, the light intensity threshold 904 can represent the amount of light intensity above which touch errors are considered unreliable and therefore invalid or in need of compensation.

Referring back to FIG. 8, at operation 804, the system can determine the validity of the touch results of touch sensing based on the light intensity measured by the light-sensing chiplets during the touch sensing (e.g., whether light measured by one or more light detectors coupled to chiplets of the plurality of chiplets configured for the light sensing operation meets or fails one or more criteria). When the light intensity is less than the light intensity threshold 904, which indicates that the touch error is less than the touch error threshold 906 (e.g., the light detected by the one or more light detectors fails to meet the one or more criteria), the touch sensing result is considered valid and can be transmitted to a touch processor (operation 812). When the light intensity readout as measured by the light-sensing chiplets during (or within a threshold time of) a touch scan is greater than the light intensity threshold 904 (e.g., when the one or more criteria include a criterion that is satisfied when the light is greater than the light intensity threshold), which indicates that the touch error exceeds the touch error threshold 906, the touch results either can be discarded as invalid (operation 806) or the processing circuitry can further process the touch results (operation 808) to compensate for light-induced error before transmission to a touch processor (operation 812).

At operation 806, the system can discard the touch results generated while the detected ambient light was above the threshold level. In some examples, the processing circuitry can further switch or transition (operation 810) the touch sensor panel 400 to a touch operation mode that is less light-sensitive than the current touch operation mode. For example, when the current touch operation mode a relatively low-frequency mutual capacitance mode (e.g., M1), the touch sensor panel 400 can transition (operation 810) to a self-capacitance mode (e.g., S1) or mutual capacitance mode with a relatively higher modulation frequency (e.g., M3). In some examples, the transition is to the highest frequency mutual capacitance mode to avoid discarding multiple frames of touch sensing results which may occur if a relatively lower frequency mutual capacitance mode is still subjected to light-induced error above the touch error threshold. In some examples, the light intensity can be used to determine the lowest frequency and/or lowest power touch sensing mode that can operate with less than a threshold touch error under the measured lighting conditions. The processing circuitry can conduct another touch scan (e.g., as second touch scan) to detect touch input with less error and greater accuracy in the touch operation mode where ambient light does not excessively interfere with touch results. In some examples, the touch sensor panel 400 can switch the panel configuration to a non-light sensing configuration (e.g., configure light-sensing chiplets for touch sensing and/or turn off the light-sensing chiplets) in the non-light-sensitive touch operation mode.

In some examples, at operation 808, the system (e.g., using the processing circuitry) can compensate the touch sensing results detected at the plurality of touch electrodes by the light-sensing chiplets for a light-induced error. The compensation enables the processing circuitry to mitigate the effects of the ambient light on the touch sensing results (e.g., reduce the touch error). In some examples, the processing circuit can compensate the light-induced touch error based on a light-to-touch interference calibration model. The light-to-touch calibration model can be generated based on light sensing and touch sensing data that is optionally simulated, experimental, and or historical (e.g., a plot such as plot 900 in FIG. 9).

Figure 10:
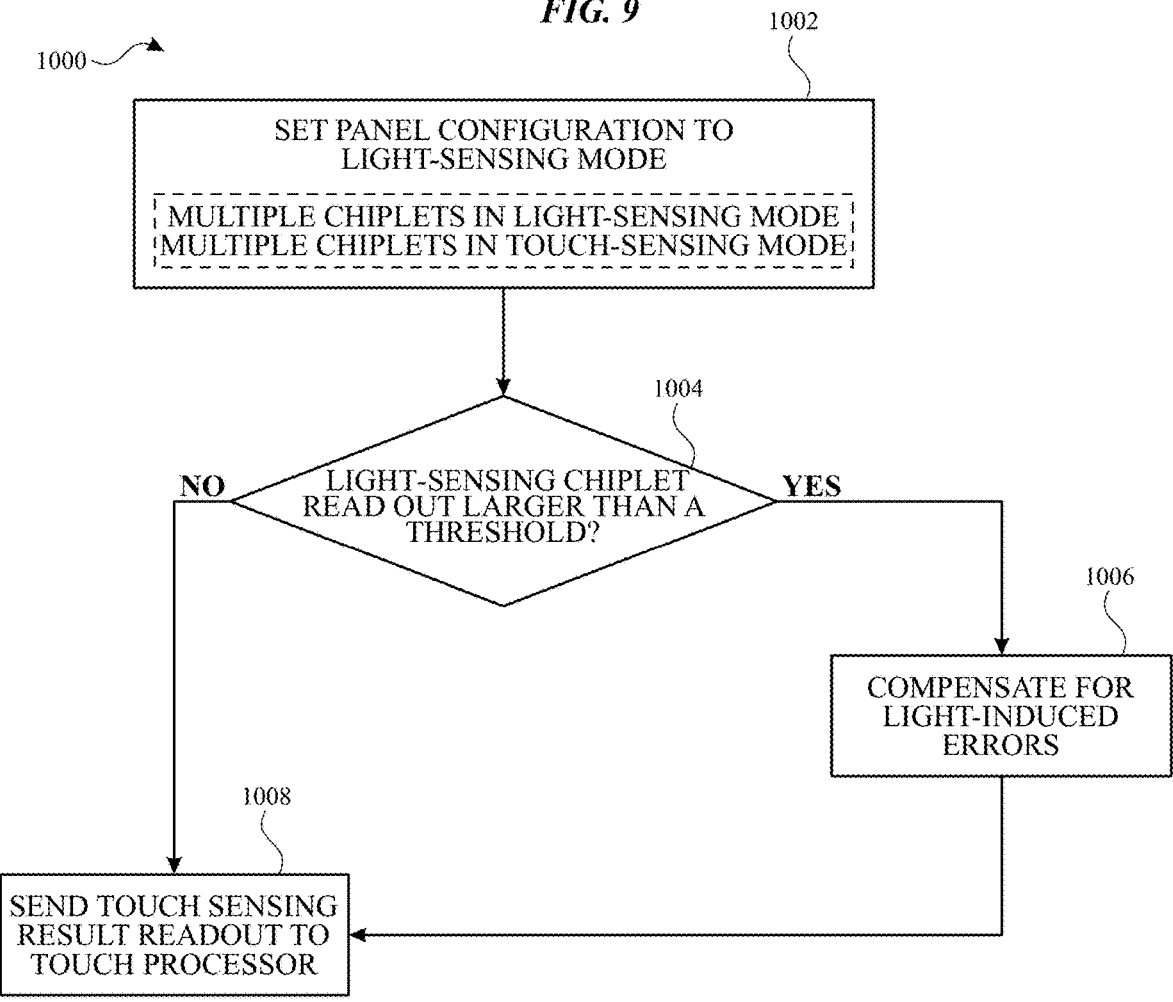
FIG. 10 illustrates an example flow diagram of an operation of the touch sensor panel in a light-sensitive touch operation mode according to examples of the disclosure.

FIG. 10 illustrates an example flow diagram of process 1000 of an operation of the touch sensor panel 400 in a light-sensitive touch operation mode according to examples of the disclosure. In process 1000, unlike in process 800, the touch sensor panel 400 compensates for light induced errors when it detects that ambient light readouts exceed a light intensity threshold and forgoes transitioning to a less light-sensitive touch operation mode. As described above, with respect to FIG. 7 at operation 708, and FIG. 8 at operation

802, at operation 1002, the system can operate or switch to operating the touch sensor panel in a light-sensing panel configuration such as a configuration where some chiplets (e.g., chiplets labeled "S") of the plurality of chiplets 404 are configured for touch-sensing operations and some chiplets (e.g., chiplets labeled "L") of the plurality of chiplets 404 are configured for light-sensing operation, such as described above and illustrated in FIG. 5. At operation 1004, the system can determine the validity of the touch results of touch sensing based on the light intensity measured by the light-sensing chiplets during (or within a threshold period of time of) the touch sensing (e.g., whether light measured by one or more light detectors coupled to chiplets of the plurality of chiplets configured for the light sensing operation meets or fails one or more criteria). When the light intensity is less than the light intensity threshold 904, which indicates a touch error less than the touch error threshold 906 (e.g., the light detected by the one or more light detectors fails to meet the one or more criteria), the touch sensing result is considered valid and can be transmitted to a touch processor (operation 1008). When the light intensity readout as measured by the light-sensing chiplets during (or within a threshold period of time of) a touch scan is greater than the light intensity threshold 904 (e.g., when the one or more criteria include a criterion that is satisfied when the light is greater than the light intensity threshold), which indicates a touch error greater than the touch error threshold 906, the processing circuitry can further process the touch results (operation 1006) to compensate for light-induced error before transmission to a touch processor (operation 1008). Unlike process 800 in FIG. 8, however, for process 1000 in FIG. 10, the system does not discard touch results corresponding to excessive light-induced errors (e.g., operation 806) and/or transition to a less light-sensitive mode (e.g., operation 810). In the mode of operation illustrated by process 1000, the touch sensor panel therefore does not switch touch operation modes based on light intensity measured in the light-sensing chiplets (though a switch in touch operation modes may be made for other reasons) but instead maintain the current light-sensitive touch operation mode while compensating for erroneous touch results. In some examples, process 1000 can be modified to always apply compensation. For example, process 1000 can be modified to include operations 1002, followed by operation 1006, followed by 1008 (without operation 1004).

Figure 11:
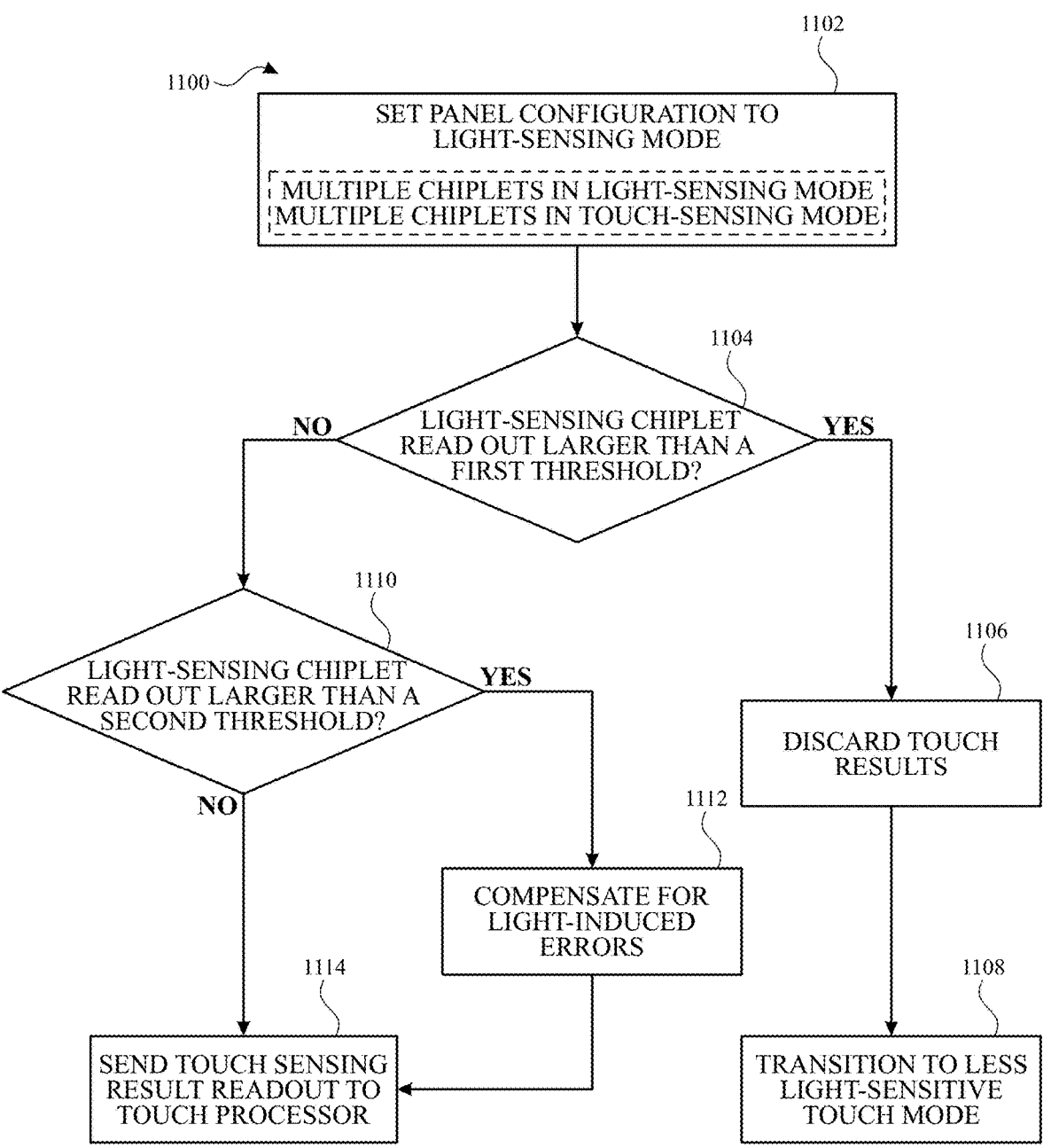
FIG. 11 illustrates an example flow diagram of an operation of the touch sensor panel in a light-sensitive touch operation mode according to examples of the disclosure.

FIG. 11 illustrates an example flow diagram of process 1100 of an operation of the touch sensor panel 400 in a light-sensitive touch operation mode according to examples of the disclosure. In process 1100, the touch sensor panel 400 compensates for light induced errors when it detects that light intensity readouts that correspond to valid touch readings (e.g., that are below a first light intensity threshold) are also above a second light intensity threshold that is less than the first light intensity threshold (without compensating for touch readings that are also below a second light intensity threshold corresponding to a lower touch error). In this case, the system applies compensation to valid touch results with a relatively high touch error rate. Accordingly, as described above, with respect to FIG. 7 at operation 708, FIG. 8 at operation 802, and FIG. 10 at operation 1002, at operation 1102, the system can operate or switch to operating the touch sensor panel in a light-sensing panel configuration such as a configuration where some chiplets (e.g., chiplets labeled "S") of the plurality of chiplets 404 are configured for touch-sensing operations and some chiplets (e.g., chiplets labeled "L") of the plurality of chiplets 404 are configured for light-sensing operation, such as described above and illustrated in FIG. 5. At operation 1104, the system can determine the validity of the touch results of touch sensing based on the light intensity measured by the light-sensing chiplets during (or within a threshold period of time of) the touch sensing (e.g., whether light measured by one or more light detectors coupled to chiplets of the plurality of chiplets configured for the light sensing operation meets or fails one or more criteria). When the light intensity readout as measured by the light-sensing chiplets during (or within a threshold period of time of) a touch scan is greater than the first light intensity threshold 904 (e.g., when the one or more criteria include a criterion that is satisfied when the light is greater than the first light intensity threshold), which indicates a touch error greater than the first touch error threshold 906, the system can discard the touch results (operation 1106) generated while the detected ambient light was above the first threshold level. In some examples, the processing circuitry can further switch or transition (operation 1108) the touch sensor panel 400 to a touch operation mode that is less light-sensitive than the current touch operation mode.

When the light intensity measured by the light-sensing chiplets is less than the first light intensity threshold 904, which indicates a touch error less than the first touch error threshold 906 (e.g., the light detected by the one or more light detectors fails to meet the one or more criteria), the touch sensing result is considered valid for the current touch operation mode. At operation 1110, the system further determines whether compensation is needed by determining whether the light intensity is above or below a second light intensity threshold 908 (lower than the first light intensity threshold 904), which corresponds to a second touch error threshold 910 (lower than the first touch error threshold 906). When the light intensity is above the second light intensity threshold 908, the system can further process the touch results (operation 1112) to compensate for light-induced error before transmission to a touch processor (operation 1114). When the light intensity of the valid touch sensing result is below the second light intensity threshold 908, the system can forgo compensating for light-induced error and instead transmits the uncompensated touch sensing results to the touch processor (operation 1114). In this case, the system thus only applies compensation to valid touch results with a relatively high touch error rate but still a valid measurement under the current touch operating mode.

Therefore, according to the above, some examples of the disclosure are directed to a touch sensor panel. The touch sensor panel can include a plurality of touch electrodes, one or more light detectors, and a plurality of chiplets configurable for light sensing operation using the one or more light detectors or touch sensing operation using the plurality of touch electrodes, and processing circuitry coupled to the plurality of chiplets. The processing circuitry can be programmed to, in a first mode of touch sensing operation: in accordance with a determination that light detected by the one or more light detectors coupled to one or more first chiplets of the plurality of chiplets configured for the light sensing operation meets one or more first criteria, the one or more first criteria including a criterion that is satisfied when the light is greater than a first light threshold, discard touch sensing results detected at the plurality of touch electrodes coupled to one or more second chiplets of the plurality of chiplets configured for the touch sensing operation. Additionally or alternatively to one or more of the examples disclosed above, in some examples, the processing circuitry can be further programmed to, in the first mode of touch sensing operation: in accordance with the determination that the light detected by the one or more light detectors meets one or more first criteria, transition from the first mode of touch sensing operation to a second mode of touch sensing operation, different than the first mode of touch sensing operation. Additionally or alternatively to one or more of the examples disclosed above, in some examples, the processing circuitry can be further programmed to, in the first mode of touch sensing operation: in accordance with a determination that the light detected by the one or more light detectors fails to meet the one or more first criteria, forgo transitioning from the first mode of touch sensing operation to the second mode of touch sensing operation. Additionally or alternatively to one or more of the examples disclosed above, in some examples, the processing circuitry can be further programmed to, in the first mode of touch sensing operation: in accordance with a determination that the light detected by the one or more light detectors fails to meet the one or more first criteria, forgo discarding the touch sensing results detected at the plurality of touch electrodes coupled to the one or more second chiplets of the plurality of chiplets. Additionally or alternatively to one or more of the examples disclosed above, in some examples, the processing circuitry can be further programmed to, in the first mode of touch sensing operation: in accordance with a determination that the light detected by the one or more light detectors meets the one or more first criteria, compensate the touch sensing results detected at the plurality of touch electrodes coupled to the one or more second chiplets of the plurality of chiplets for a light-induced error. Additionally or alternatively to one or more of the examples disclosed above, in some examples, the processing circuitry can be further programmed to, in the first mode of touch sensing operation: in accordance with a determination that the light detected by the one or more light detectors fails to meet the one or more first criteria, in accordance with a determination that the light detected by the one or more light detectors is greater than a second threshold, less than the first light threshold, compensate the touch sensing results detected at the plurality of touch electrodes coupled to the one or more second chiplets of the plurality of chiplets for a light-induced error. Additionally or alternatively to one or more of the examples disclosed above, in some examples, the processing circuitry can be further programmed to, in the first mode of touch sensing operation: in accordance with a determination that the light detected by the one or more light detectors is less than the second threshold, forgo compensating the touch sensing results detected at the plurality of touch electrodes coupled to the one or more second chiplets of the plurality of chiplets for a light-induced error. Additionally or alternatively to one or more of the examples disclosed above, in some examples, a number of the one or more first chiplets of the plurality of chiplets configured for light sensing operation can be less than a number of the one or more second chiplets of the plurality of chiplets configured for touch sensing operation. Additionally or alternatively to one or more of the examples disclosed above, in some examples, the one or more first chiplets can be spaced apart across the touch sensor panel. Additionally or alternatively to one or more of the examples disclosed above, in some examples, each of the one or more first chiplets can be located within a threshold distance of one or more corners of the touch sensor panel. Additionally or alternatively to one or more of the examples disclosed above, in some examples, the processing circuitry can be further programmed to, in the first mode of touch sensing operation: configure the one or more first chiplets of the plurality of chiplets to light sensing operation using AC light sensing. Additionally or alternatively to one or more of the examples disclosed above, in some examples, the processing circuitry can be further programmed to, in the first mode of touch sensing operation: configure the one or more first chiplets of the plurality of chiplets to light sensing operation using DC light sensing. Additionally or alternatively to one or more of the examples disclosed above, in some examples, the processing circuitry can be further programmed to, in the second mode of touch sensing operation: configure the one or more first chiplets of the plurality of chiplets to touch-sensing operation using the plurality of touch electrodes. Additionally or alternatively to one or more of the examples disclosed above, in some examples, the processing circuitry can be further programmed to, in the second mode of touch sensing operation: in accordance with a determination that the light detected by the one or more light detectors meets one or more second criteria, the one or more second criteria including a criterion that is satisfied when the light detected by the one or more light detectors is less than a third light threshold, transition from the second mode of touch sensing operation to the first mode of touch sensing operation, wherein the processing circuitry is further programmed to, in the first mode of touch sensing operation, configure the one or more first chiplets of the plurality of chiplets to light sensing operation using the one or more light detectors. Additionally or alternatively to one or more of the examples disclosed above, in some examples, the processing circuitry can be further programmed to, in the second mode of touch sensing operation: in accordance with a determination that a state of an electronic device meets one or more second criteria, the one or more second criteria including a criterion that is satisfied when an electronic device including the touch sensor panel is in a charging state, transition to the first mode of touch sensing operation and configure the one or more first chiplets of the plurality of chiplet to light sensing operation using the one or more light detectors.

Some examples of the disclosure are directed to an electronic device. The electronic device can include an energy storage device, communication circuitry, and a touch screen including a display, a plurality of touch electrodes, one or more light detectors, a plurality of chiplets configurable for light sensing operation using the one or more light detectors or touch sensing operation using the plurality of touch electrodes; and processing circuitry coupled to the plurality of chiplets. The processing circuitry can be programmed to, in a first mode of touch sensing operation: in accordance with a determination that light detected by the one or more light detectors coupled to one or more first chiplets of the plurality of chiplets configured for the light sensing operation meets one or more first criteria, the one or more first criteria including a first criterion that is satisfied when the light is greater than a first light threshold, discard touch sensing results detected at the plurality of touch electrodes coupled to one or more second chiplets of the plurality of chiplets configured for the touch sensing operation.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:
1. A touch sensor panel comprising:
a plurality of touch electrodes;
one or more light detectors; and a plurality of chiplets configurable for light sensing operation using the one or more light detectors or touch sensing operation using the plurality of touch electrodes; and processing circuitry coupled to the plurality of chiplets, the processing circuitry programmed to, in a first mode of touch sensing operation:

in accordance with a determination that light detected by the one or more light detectors coupled to one or more first chiplets of the plurality of chiplets configured for the light sensing operation meets one or more first criteria, the one or more first criteria including a criterion that is satisfied when the light is greater than a first light threshold, discard touch sensing results detected at the plurality of touch electrodes coupled to one or more second chiplets of the plurality of chiplets configured for the touch sensing operation.

2. The touch sensor panel of claim 1, wherein the processing circuitry is further programmed to, in the first mode of touch sensing operation:

in accordance with the determination that the light detected by the one or more light detectors meets one or more first criteria, transition from the first mode of touch sensing operation to a second mode of touch sensing operation, different than the first mode of touch sensing operation.

3. The touch sensor panel of claim 2, wherein the processing circuitry is further programmed to, in the first mode of touch sensing operation:

in accordance with a determination that the light detected by the one or more light detectors fails to meet the one or more first criteria, forgo transitioning from the first mode of touch sensing operation to the second mode of touch sensing operation.

4. The touch sensor panel of claim 1, wherein the processing circuitry is further programmed to, in the first mode of touch sensing operation:

in accordance with a determination that the light detected by the one or more light detectors fails to meet the one or more first criteria, forgo discarding the touch sensing results detected at the plurality of touch electrodes coupled to the one or more second chiplets of the plurality of chiplets.

5. The touch sensor panel of claim 1, wherein the processing circuitry is further programmed to, in the first mode of touch sensing operation:

in accordance with a determination that the light detected by the one or more light detectors meets the one or more first criteria, compensate the touch sensing results detected at the plurality of touch electrodes coupled to the one or more second chiplets of the plurality of chiplets for a light-induced error.

6. The touch sensor panel of claim 1, wherein the processing circuitry is further programmed to, in the first mode of touch sensing operation:

in accordance with a determination that the light detected by the one or more light detectors fails to meet the one or more first criteria, in accordance with a determination that the light detected by the one or more light detectors is greater than a second threshold, less than the first light threshold, compensate the touch sensing results detected at the plurality of touch electrodes coupled to the one or more second chiplets of the plurality of chiplets for a light-induced error.

7. The touch sensor panel of claim 6, wherein the processing circuitry is further programmed to, in the first mode of touch sensing operation:

in accordance with a determination that the light detected by the one or more light detectors is less than the second threshold, forgo compensating the touch sensing results detected at the plurality of touch electrodes coupled to the one or more second chiplets of the plurality of chiplets for a light-induced error.

8. The touch sensor panel of claim 1, wherein a number of the one or more first chiplets of the plurality of chiplets configured for light sensing operation is less than a number of the one or more second chiplets of the plurality of chiplets configured for touch sensing operation.

9. The touch sensor panel of claim 1, wherein the one or more first chiplets are spaced apart across the touch sensor panel.

10. The touch sensor panel of claim 9, wherein each of the one or more first chiplets is located within a threshold distance of one or more corners of the touch sensor panel.

11. The touch sensor panel of claim 1, wherein the processing circuitry is further programmed to, in the first mode of touch sensing operation:

configure the one or more first chiplets of the plurality of chiplets to light sensing operation using AC light sensing.

12. The touch sensor panel of claim 1, wherein the processing circuitry is further programmed to, in the first mode of touch sensing operation:

configure the one or more first chiplets of the plurality of chiplets to light sensing operation using DC light sensing.

13. The touch sensor panel of claim 2, wherein the processing circuitry is further programmed to, in the second mode of touch sensing operation:

configure the one or more first chiplets of the plurality of chiplets to touch-sensing operation using the plurality of touch electrodes.

14. The touch sensor panel of claim 13, wherein the processing circuitry is further programmed to, in the second mode of touch sensing operation:

in accordance with a determination that the light detected by the one or more light detectors meets one or more second criteria, the one or more second criteria including a criterion that is satisfied when the light detected by the one or more light detectors is less than a third light threshold, transition from the second mode of touch sensing operation to the first mode of touch sensing operation, wherein the processing circuitry is further programmed to, in the first mode of touch sensing operation, configure the one or more first chiplets of the plurality of chiplets to light sensing operation using the one or more light detectors.

15. The touch sensor panel of claim 13, wherein the processing circuitry is further programmed to, in the second mode of touch sensing operation:

in accordance with a determination that a state of an electronic device meets one or more second criteria, the one or more second criteria including a criterion that is satisfied when an electronic device including the touch sensor panel is in a charging state, transition to the first mode of touch sensing operation and configure the one or more first chiplets of the plurality of chiplet to light sensing operation using the one or more light detectors.

16. An electronic device comprising:
an energy storage device;
communication circuitry; and a touch screen including:
  a display;
  a plurality of touch electrodes;
  one or more light detectors; and
  a plurality of chiplets configurable for light sensing operation using the one or more light detectors or touch sensing operation using the plurality of touch electrodes; and
  processing circuitry coupled to the plurality of chiplets, the processing circuitry programmed to, in a first mode of touch sensing operation:
    in accordance with a determination that light detected by the one or more light detectors coupled to one or more first chiplets of the plurality of chiplets configured for the light sensing operation meets one or more first criteria, the one or more first criteria including a first criterion that is satisfied when the light is greater than a first light threshold, discard touch sensing results detected at the plurality of touch electrodes coupled to one or more second chiplets of the plurality of chiplets configured for the touch sensing operation.

17. The electronic device of claim 16, wherein the processing circuitry is further programmed to, in the first mode of touch sensing operation:
  in accordance with the determination that the light detected by the one or more light detectors meets one or more first criteria, transition from the first mode of touch sensing operation to a second mode of touch sensing operation, different than the first mode of touch sensing operation.

18. The electronic device of claim 16, wherein the processing circuitry is further programmed to, in the first mode of touch sensing operation:
  in accordance with a determination that the light detected by the one or more light detectors meets the one or more first criteria, compensate the touch sensing results detected at the plurality of touch electrodes coupled to the one or more second chiplets of the plurality of chiplets for a light-induced error.

19. The electronic device of claim 16, wherein the processing circuitry is further programmed to, in the first mode of touch sensing operation:
  in accordance with a determination that the light detected by the one or more light detectors fails to meet the one or more first criteria,
  in accordance with a determination that the light detected by the one or more light detectors is greater than a second threshold, less than the first light threshold, compensate the touch sensing results detected at the plurality of touch electrodes coupled to the one or more second chiplets of the plurality of chiplets for a light-induced error.

20. The electronic device of claim 17, wherein the processing circuitry is further programmed to, in the second mode of touch sensing operation:
  configure the one or more first chiplets of the plurality of chiplets to touch-sensing operation using the plurality of touch electrodes.

* * * * *